US012791526B2

(12) United States Patent
Bahr et al.

(10) Patent No.: US 12,791,526 B2
(45) Date of Patent: Nov. 10, 2026

(54) INTEGRATED CIRCUIT INTEGRITY AND SECURITY BREACH DETECTION

(71) Applicant: TEXAS INSTRUMENTS INCORPORATED, Dallas, TX (US)

(72) Inventors: Bichoy Waguih Bahr, Allen, TX (US); Ting-Ta Yen, San Jose, CA (US); Yogesh Kumar Ramadass, San Jose, CA (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 362 days.

(21) Appl. No.: 18/180,666

(22) Filed: Mar. 8, 2023

(65) Prior Publication Data

US 2024/0302326 A1 Sep. 12, 2024

(51) Int. Cl.

| | |
|---|---|
| ***G01N 29/09*** | (2006.01) |
| ***G01N 29/24*** | (2006.01) |
| ***G01N 29/34*** | (2006.01) |
| ***G06F 21/76*** | (2013.01) |

(52) U.S. Cl.

CPC ......... *G01N 29/09* (2013.01); *G01N 29/2437* (2013.01); *G01N 29/2475* (2013.01); *G01N 29/348* (2013.01); *G06F 21/76* (2013.01); *G01N 2291/018* (2013.01)

(58) Field of Classification Search

None

See application file for complete search history.

(56) References Cited

U.S. PATENT DOCUMENTS

| | | | | |
|---|---|---|---|---|
| 9,617,144 | B2 * | 4/2017 | Tsai | B81B 7/02 |
| 10,084,426 | B2 | 9/2018 | Bahr | |
| 10,541,697 | B2 | 1/2020 | Bahr et al. | |
| 10,622,966 | B2 | 4/2020 | Yen et al. | |
| 11,228,280 | B1 | 1/2022 | Bahr et al. | |
| 11,387,919 | B2 | 7/2022 | Bahr et al. | |
| 2007/0284970 | A1 * | 12/2007 | Fujita | H01L 24/97 310/344 |
| 2008/0011402 | A1 * | 1/2008 | Shiraishi | H01L 21/563 422/291 |
| 2017/0090028 | A1 * | 3/2017 | Djordjev | G01S 15/89 |
| 2020/0127635 | A1 * | 4/2020 | Matsumoto | H03H 9/725 |
| 2020/0212872 | A1 | 7/2020 | Haroun et al. | |
| 2020/0212879 | A1 | 7/2020 | Bahr et al. | |
| 2020/0212881 | A1 | 7/2020 | Bahr et al. | |
| 2021/0099237 | A1 | 4/2021 | Bahr | |
| 2021/0203332 | A1 | 7/2021 | Bahr et al. | |

* cited by examiner

*Primary Examiner* — Suman K Nath

(74) *Attorney, Agent, or Firm* — Zhenhai Fu; Charles F. Koch

(57) ABSTRACT

An integrated circuit (IC) includes a semiconductor substrate and a mold compound on the semiconductor substrate. The IC also includes an acoustic signal generator between the mold compound and the semiconductor substrate. The acoustic signal generator is configured to transmit an acoustic signal having a predetermined set of frequencies through at least one of the semiconductor substrate or the mold compound.

24 Claims, 19 Drawing Sheets

INTEGRATED CIRCUIT INTEGRITY AND SECURITY BREACH DETECTION

BACKGROUND

An integrated circuit (IC) includes one or more semiconductor dies encapsulated in a mold compound to protect the semiconductor dies. The IC is also mounted (e.g., by soldering) to a printed circuit board (PCB) or other substrate as part of a system, in which the IC receives power and to interface with other component of the system via the circuit board. Due to various reasons, such as mechanical stress, tempering, etc., cracks and/or delamination may appear in the mold compound, the semiconductor die, etc., or the mold compound can be partially or completely removed, all of which can compromise the mechanical integrity of the IC. Also, the IC may be removed from an authorized system and then bonded to an unauthorized system. Unauthorized objects (e.g., antenna) may also be attached on the mold compound external surface of the IC. In both cases, the security of the IC may be compromised.

SUMMARY

A first example relates to an integrated circuit (IC) that includes a semiconductor substrate and a mold compound on the semiconductor substrate. The IC also includes an acoustic signal generator between the mold compound and the semiconductor substrate. The acoustic signal generator is configured to transmit an acoustic signal having a predetermined set of frequencies through at least one of the semiconductor substrate or the mold compound.

A second example relates to a method for transmitting acoustic signals. The method includes generating acoustic signals having a predetermined set of frequencies with a resonator. The method also includes transmitting the acoustic signals via at least one of a mold compound or a semiconductor substrate of an IC. The method includes measuring an impedance between two electrodes of the resonator at each frequency of the predetermined set of frequencies during the transmitting. The method also includes generating an impedance spectrum based on the measured impedances. The method includes detecting a mechanical integrity compromise or attachment of unknown component on based on the impedance spectrum.

A third example relates to a non-transitory computer readable medium. The non-transitory computer readable medium stores instructions that, when executed by a controller of an IC, causes the controller to: generate acoustic signals having a predetermined set of frequencies via a transducer of the IC; transmit the acoustic signals via at least one of a mold compound or a semiconductor substrate of the IC; measure an impedance between two electrodes of the transducer at each frequency of the predetermined set of frequencies during the transmitting; generate an impedance spectrum based on the measured impedances; and detect a mechanical integrity compromise of the IC or attachment of unknown component to the IC on based on the impedance spectrum.

BRIEF DESCRIPTION OF THE DRAWINGS

The same reference numbers or other reference designators are used in the drawings to designate the same or similar (either by function and/or structure) features.

DETAILED DESCRIPTION

Figure 1:
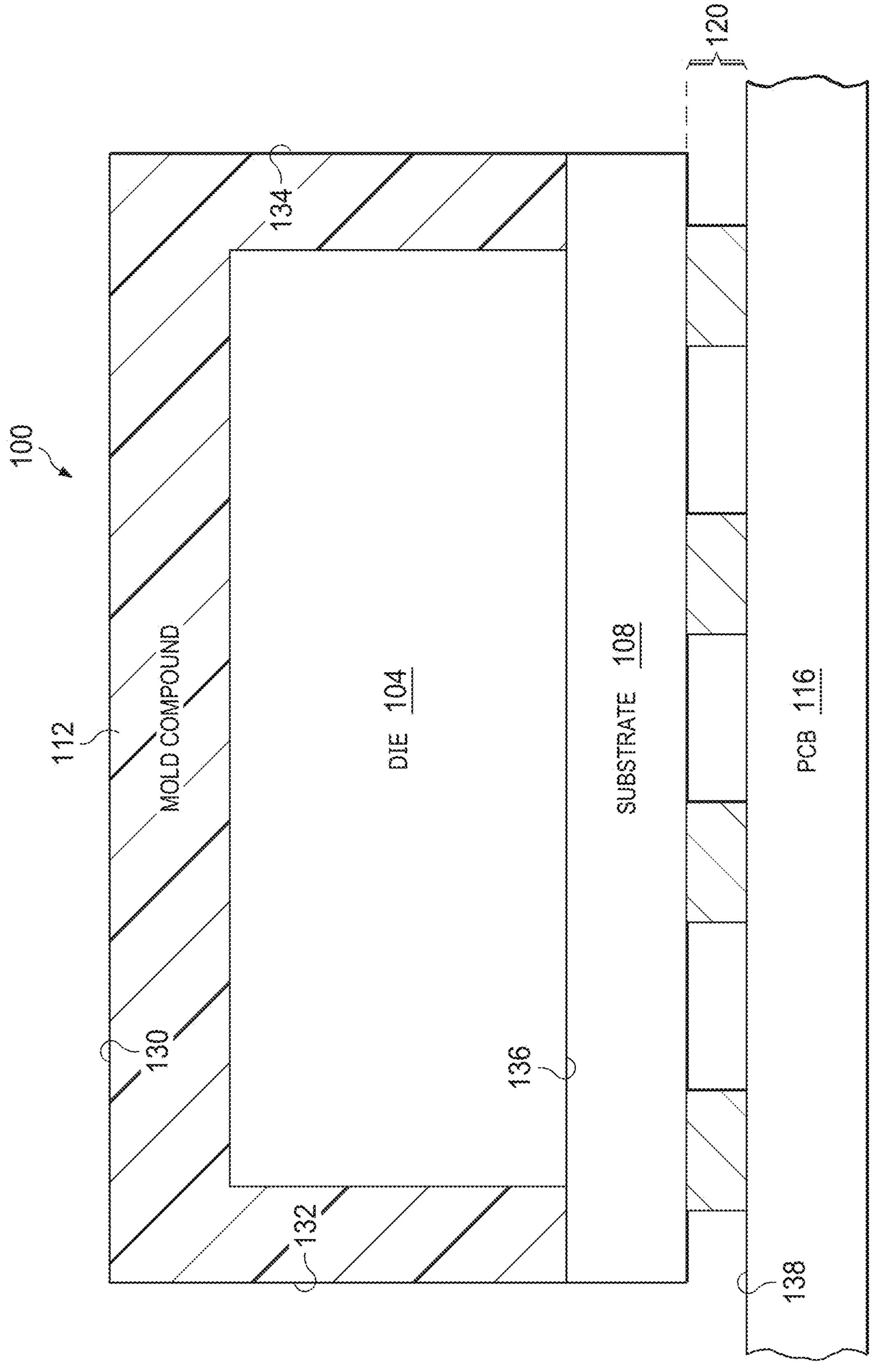
FIG. 1 is a schematic of a system including an IC and a PCB.

This disclosure relates to an integrated circuit (IC) that includes a circuit for testing a mechanical integrity or a security of an IC. The IC includes a semiconductor die on a first side of a package substrate (e.g., lead frame) and encapsulated in a mold compound forming a package. The IC also includes interconnects (e.g., solder bumps) on a second side of the package substrate. The circuit can be on the semiconductor die and includes an impedance spectrometer and an acoustic signal generator. The acoustic signal generator can include, for example, a piezoelectric transducer configured to generate acoustic signals, such as ultrasonic signals. The impedance spectrometer includes a drive signal generator and a processing circuit (e.g., control logic). The processing circuit provides a control signal to the signal generator. Responsive to the control signal, the drive signal generator provides drive signal across the electrodes of the piezoelectric transducer at a particular frequency within a predetermine set of frequencies. The drive signal can be in the form of a current signal. The particular frequency is dictated by the control signal.

Responsive to the drive signal, the acoustic signal generator transmits acoustic signals (an acoustic wave) having the particular frequency. The acoustic signal generator is configured to transmit the acoustic signals along different directions in the IC, such as circuit and through the mold compound, and below the circuit and through the semiconductor die, and the different directions can form different angles with respect to a surface of the semiconductor die. The acoustic signals can reflect from, for example, the mold compound surfaces, the lead frame, and/or the PCB on which the IC is mounted, and the reflected acoustic signals and the transmitted acoustic signals can combine to form standing waves. The amplitude of the standing wave depends on the phase difference between the reflected and transmitted acoustic signals, which depends on the wavelength (and frequency) of the acoustic signal. The amplitude of the standing wave also depends other factors, such as the structural property of the mold compound, whether an object is attached on the package surface, a property of the PCB on which the IC is mounted, etc. All these factors can impact the reflection of the acoustic signals and the amplitude and/or phase of the reflected acoustic signal, and the amplitude of the resulting standing wave.

During an interval of time that the acoustic signal generator provides the acoustic signal, the processing circuit measures a voltage signal across electrodes of the piezoelectric transducer of the acoustic signal generator. The voltage signal can represent the amplitude of the standing wave. In a case where the drive signal is a current signal, the processing circuit can compute a ratio between the voltage and the current signals to determine an impedance. The processing circuit can determine the impedance for each frequency of the predetermine set of frequencies to generate a an impedance spectrum. The impedance spectrum can indicate whether the integrity and/or security of the IC has been breached. As explained above, the frequency-dependent amplitude of the standing wave (and the impedance) can also reflect the structural property of the mold compound, such as existence of cracks and/or delamination in the mold compound, cracks in the semiconductor die, etc. The amplitude of the standing wave (and the impedance) can also reflect whether an object is attached on the package surface, a property of the PCB on which the IC is mounted, etc., both can indicate whether the security of the IC has been breached. In some examples, the processing circuit can compare the computed impedance spectrum with a reference impedance spectrum to determine a difference. If the difference exceeds a threshold, the processing circuit asserts an alert signal indicating that the mechanical (structural) integrity or the security of the IC has been breached. The processing circuit may also perform other functions, such as disabling some or all circuits on the IC to prevent malicious access to various functions of the circuits and/or the data stored in the IC. With such arrangements, an IC can automatically detect integrity and/or security breach using an integrated acoustic signal generator, and perform certain actions responsive to the detection of the breach, which can enhance the reliability and security of the IC. Also, the acoustic signal generator can provide other functions (e.g., clocking) other than for security/integrity breach detection, which can reduce the cost (e.g., device footprint, power, etc.) for security/integrity breach detection.

FIG. 1 illustrates an example IC 100. IC 100 includes a semiconductor die 104 mounted on a package substrate 108. The semiconductor die 104 includes a semiconductor substrate and metal layers on the semiconductor substrate. In some examples, the package substrate includes a lead frame. In various examples, the IC 100 is a quad-flat no-leads (QFN) leads IC, a dual-flat no-leads (DFN) IC, etc. Also, the semiconductor die 104 is encapsulated in a mold compound 112, such as plastic. In the example illustrated, the IC 100 (and the package substrate 108) is mounted on a printed circuit board (PCB) 116 via interconnects 120 (e.g., solder bumps).

The die 104 includes an acoustic signal generator, such as an acoustic transducer with two or more electrodes. Although the IC 100 is illustrated as having a single die 104, in other examples, the IC 100 includes multiple dies. In some examples of these situations, some portions of the circuit embedded in the die 104 are distributed between the multiple dies.

Figure 2:
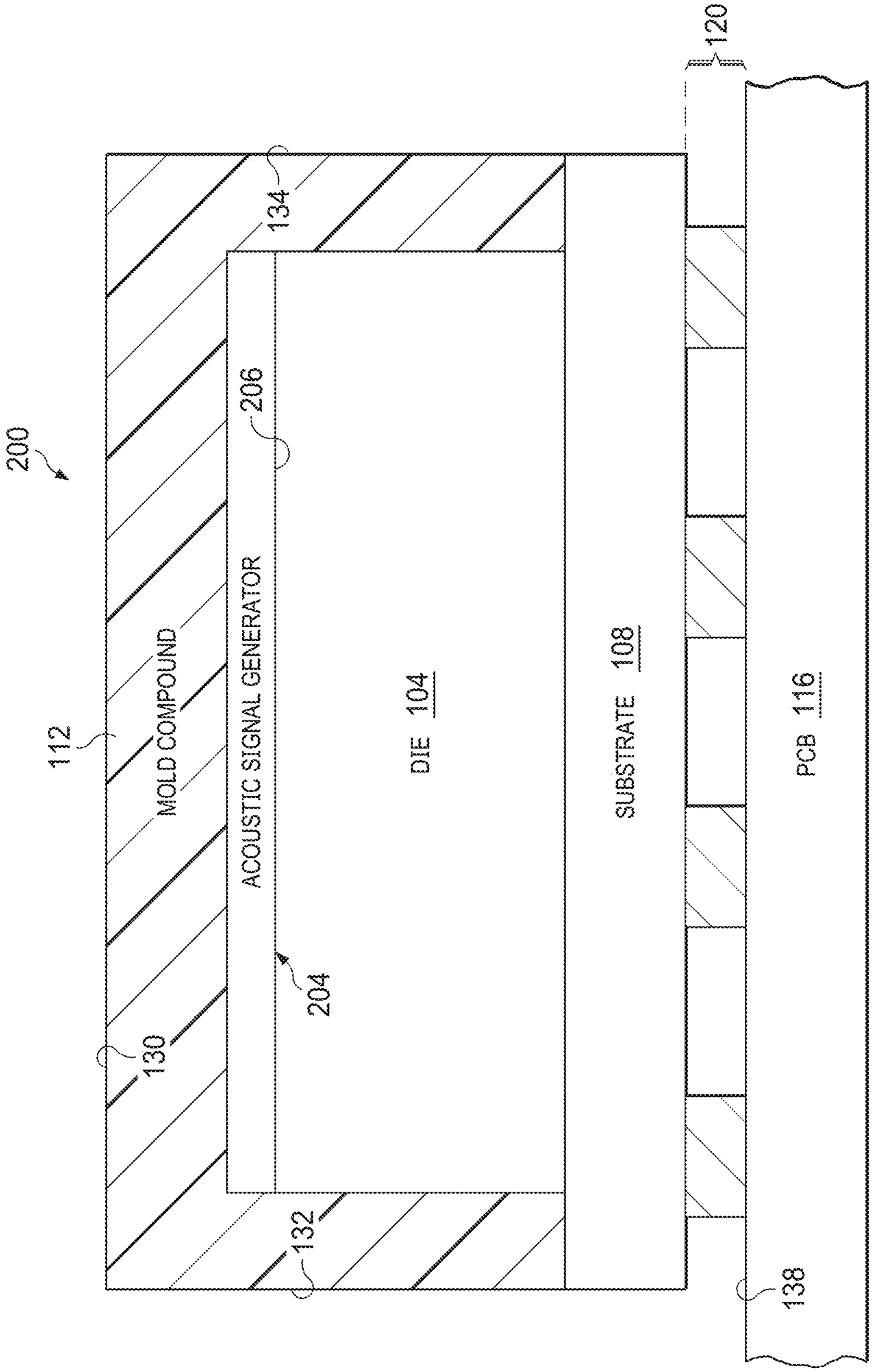
FIG. 2 is a schematic of a system including an IC and a PCB.

In some examples, the acoustic signal generator is external to the IC 100. In other examples, the acoustic signal generator is integrated with the IC 100. FIG. 2 illustrates an example of an IC 200 that has an integrated acoustic signal generator 204 in or on the semiconductor die 104. FIGS. 1 and 2 employ the same reference numbers to denote the same structure. In some examples, the acoustic signal generator 204 includes a transducer with at least two electrodes. In such examples, the acoustic signal generator 204 includes a piezoelectric transducer having a piezoelectric material coupled between/to the at least two electrodes. The acoustic signal generator 204 includes an acoustic generator terminal 206 coupled to one of the at least two electrodes. In some examples, the acoustic signal generator 204 includes a bulk acoustic wave (BAW) resonator or a surface acoustic wave (SAW) resonator. In some examples, the acoustic signal generator 204 can generate ultrasonic signals. The signal generator 204 is on the semiconductor die 104 and situated between part of the mold compound 112 and the package substrate 108. The acoustic signal generator 204 can transmit acoustic signals via the mold compound 112 and/or the semiconductor substrate 108.

Referring back to FIG. 1, the circuit of the die 104 includes a drive signal generator and an impedance spectrometer circuit. The acoustic signal generator is configured to provide an acoustic wave responsive to a drive signal (e.g., a current signal) provided from the drive signal generator at a particular frequency. The acoustic signal generator is configured to transmit acoustic signals having a predetermined set of frequencies through the semiconductor die 104 and/or the mold compound 112. In some examples, the acoustic signals transmitted by the acoustic signal generator can propagate through at least one of the substrate 108 or the mold compound 112. The acoustic signal is transmitted at each frequency in the predetermined set of frequencies for a predetermined interval of time, such as about 100 milliseconds or more. The acoustic signals can be reflected at various boundaries/discontinuities, such as at mold compound surfaces 130, 132, 134, at interface 136 between semiconductor die 104 and package substrate 108, at surface 138 at PCB 116, etc. The reflected signal can propagate through the mold compound 112 and/or the semiconductor die 104 and reach back the acoustic signal generator 204. The impedance spectrometer circuit is in the semiconductor die 104 is configured to compute an impedance of the acoustic signal generator during an interval of time that the acoustic signal generator transmits the acoustic signal. Moreover, the impedance spectrometer stores data characterizing the measured impedance of the acoustic signal generator for the predetermined set of frequencies.

The impedance spectrometer in the die 104 compares the computed impedance of the acoustic signal generator to a stored reference impedance for the same frequency as the predetermined set of frequencies to determine a difference. The difference can represent, for example, an impedance difference at a particular frequency, or an aggregate (e.g., average) impedance difference across the predetermined set of frequencies. The impedance spectrometer circuit is configured to generate an alert signal responsive to the difference exceeding a threshold, which can indicate an integrity breach and/or a security breach of the IC. In some examples, the alert signal is provided to an external system. In other examples, the alert signal is stored in an internal memory of the impedance spectrometer, or elsewhere in the semiconductor die 104. In some examples, other circuits in the semiconductor die 104 can perform other functions responsive to the alert signal, such as disabling some or all circuits on the IC to prevent malicious access to various functions of the circuits and/or the data stored in the IC.

FIGS. 3-7 illustrate examples of acoustic signal generators that are employable to implement the acoustic signal generator 204 of FIG. 2.

Figure 3:
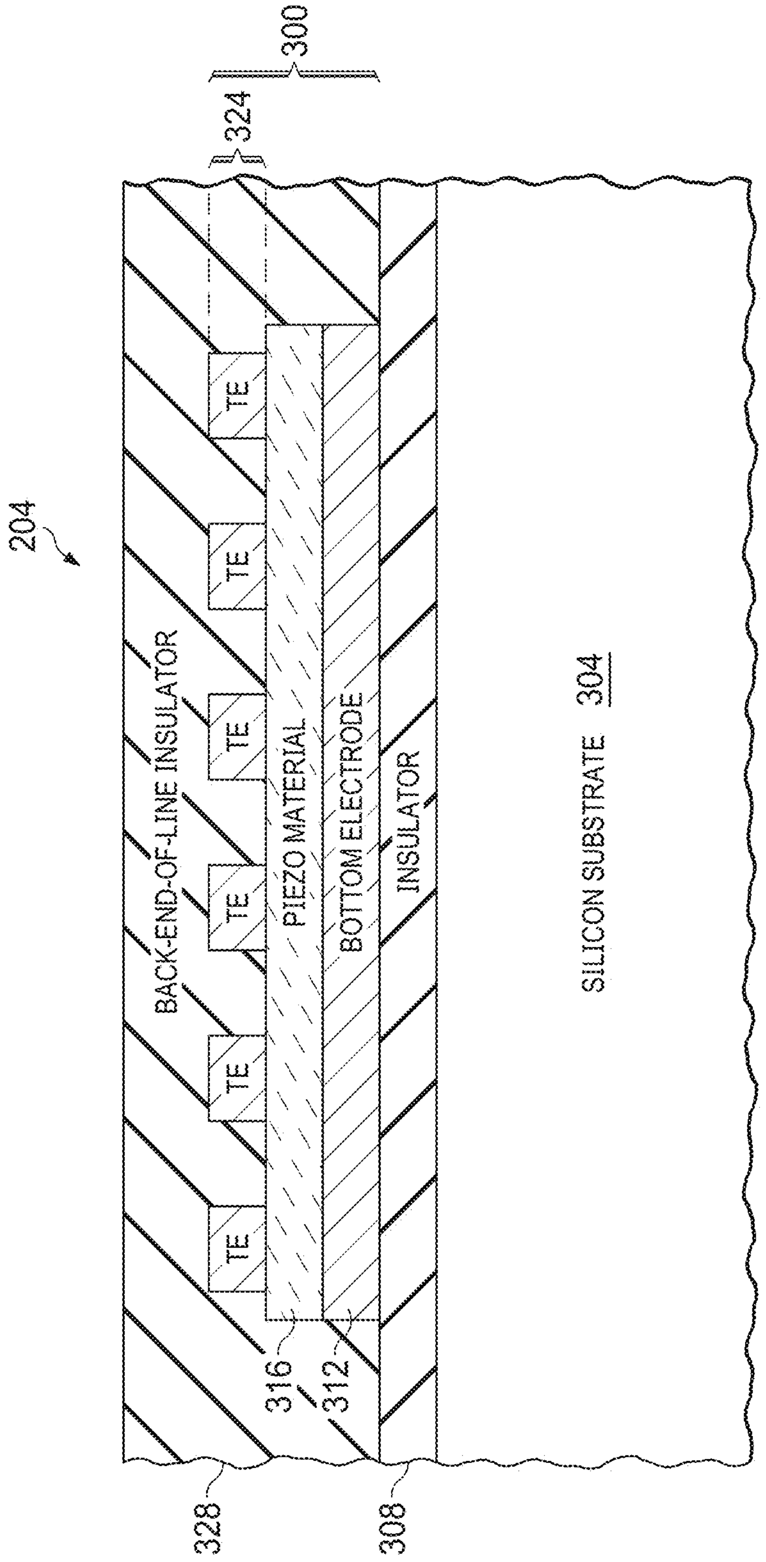
FIG. 3, FIG. 4, FIG. 5, FIG. 6, and FIG. 7 are schematics of examples of acoustic signal generator that can be part of the example ICs of FIGS. 1 and 2.

FIG. 3 illustrates a first example of acoustic signal generator 204. The acoustic signal generator 204 includes a piezoelectric transducer 300 on a silicon substrate 304 of the semiconductor die 104. An insulator 308 (e.g., an insulating layer), such as a dielectric, can be between the silicon substrate 304 and piezoelectric transducer 300. Piezoelectric transducer 300 can include a bottom electrode (BE) 312 over the silicon substrate 304. A layer of piezoelectric material 316 overlies the bottom electrode 312. An inter-digitated structure (e.g., fingers) of conductive material forms top electrodes (TE) 324 of the piezoelectric transducer 300. In this manner, the piezoelectric material 316 is sandwiched between the top electrodes 324 and the bottom electrode 312. A back-end-of-line (BEOL) insulator 328 encapsulates the bottom electrode 312, the piezoelectric material 316 and the top electrodes 324.

Figure 4:
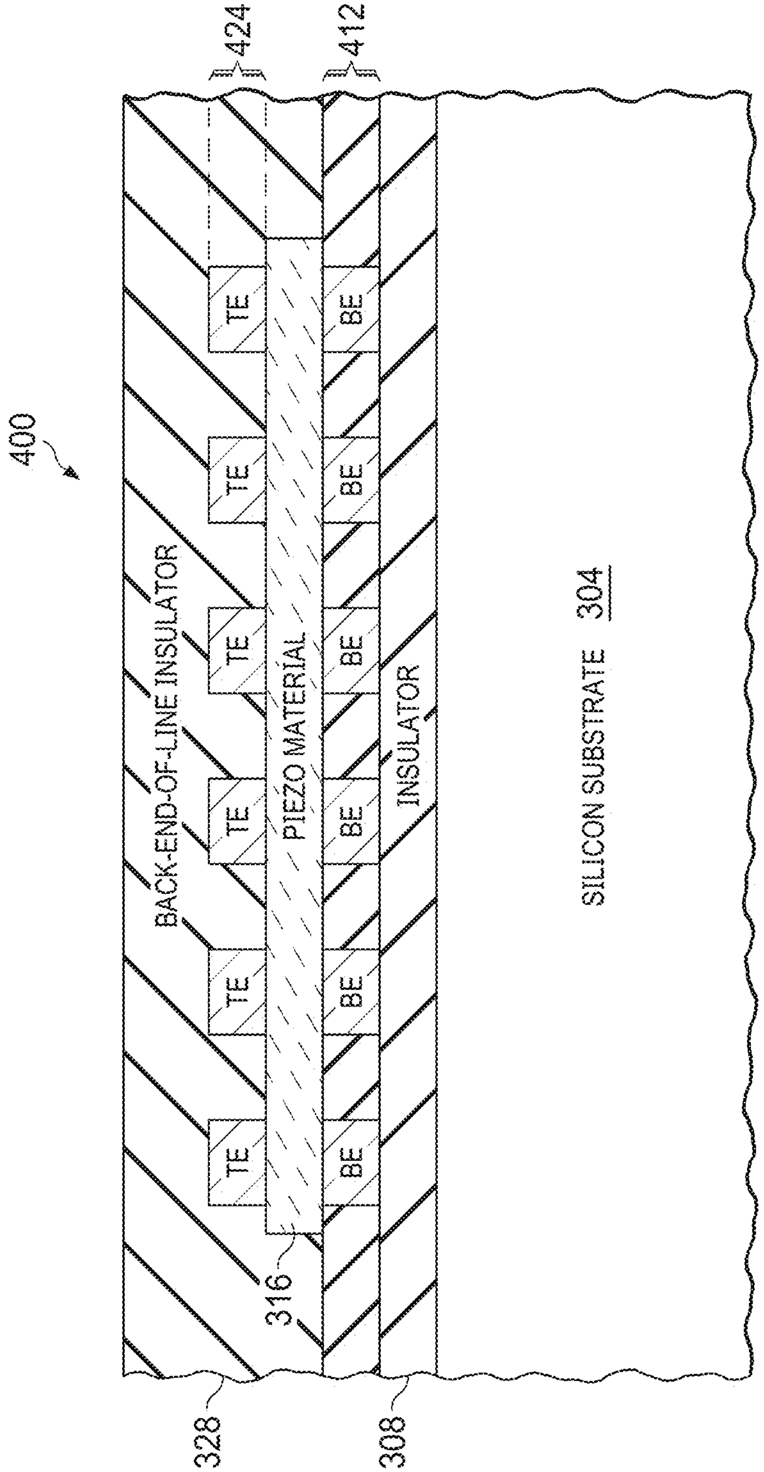

FIG. 4 illustrates a second example of acoustic signal generator 204. The example acoustic signal generator 204 of FIG. 4 includes a piezoelectric transducer 400, which includes bottom electrodes (BE) 412 forming an inter-digitated structure (e.g., fingers) overlies the silicon substrate 304. A layer of piezoelectric material 316 overlies the bottom electrodes 412. An inter-digitated structure of conductive material forms top electrodes (TE) 424 of the piezoelectric transducer 400. In this manner, the piezoelectric material 316 is sandwiched between the top electrodes 324 and the bottom electrodes 412. A BEOL insulator 328 encapsulates the bottom electrodes 412, the piezoelectric material 316 and the top electrodes 324.

Figure 5:
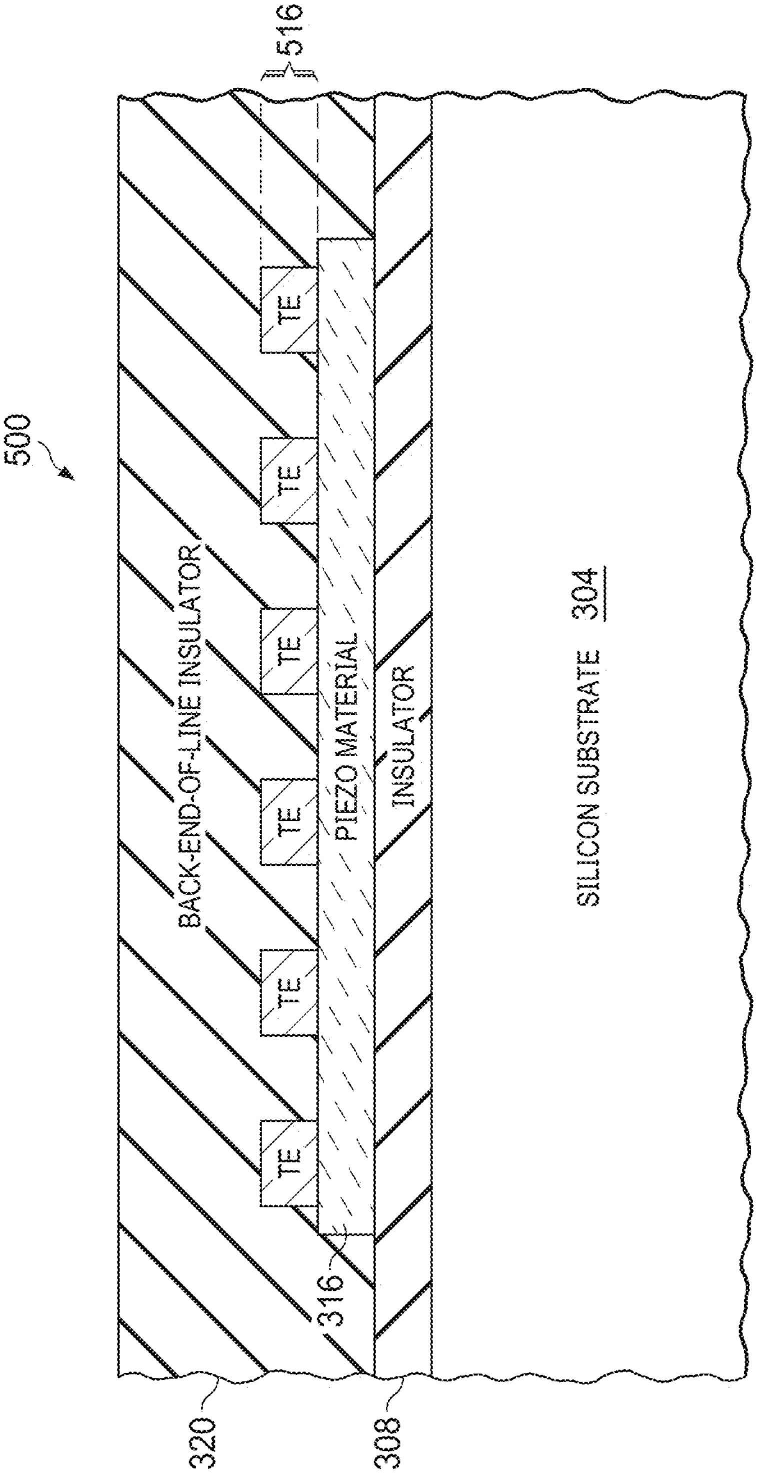

FIG. 5 illustrates a third example of acoustic signal generator 204. The acoustic signal generator 204 includes a piezoelectric transducer 500, which includes inter-digitated structure of conductive material forms top electrodes (TE) 516 of the piezoelectric transducer 500 over the piezoelectric material 316 and insulator 308. In this manner, the piezoelectric material 512 is sandwiched between the top electrodes 516 and the insulator 508. A back-end-of-line insulator 320 encapsulates the piezoelectric material 316 and the top electrodes 516. As compared to the piezoelectric transducers 300 and 400 of FIGS. 3 and 4, respectively, the piezoelectric transducer 500 omits a bottom electrode, and instead relies on a fringe field formed at an interface of the piezoelectric material 316 and the insulator 308.

Figure 6:
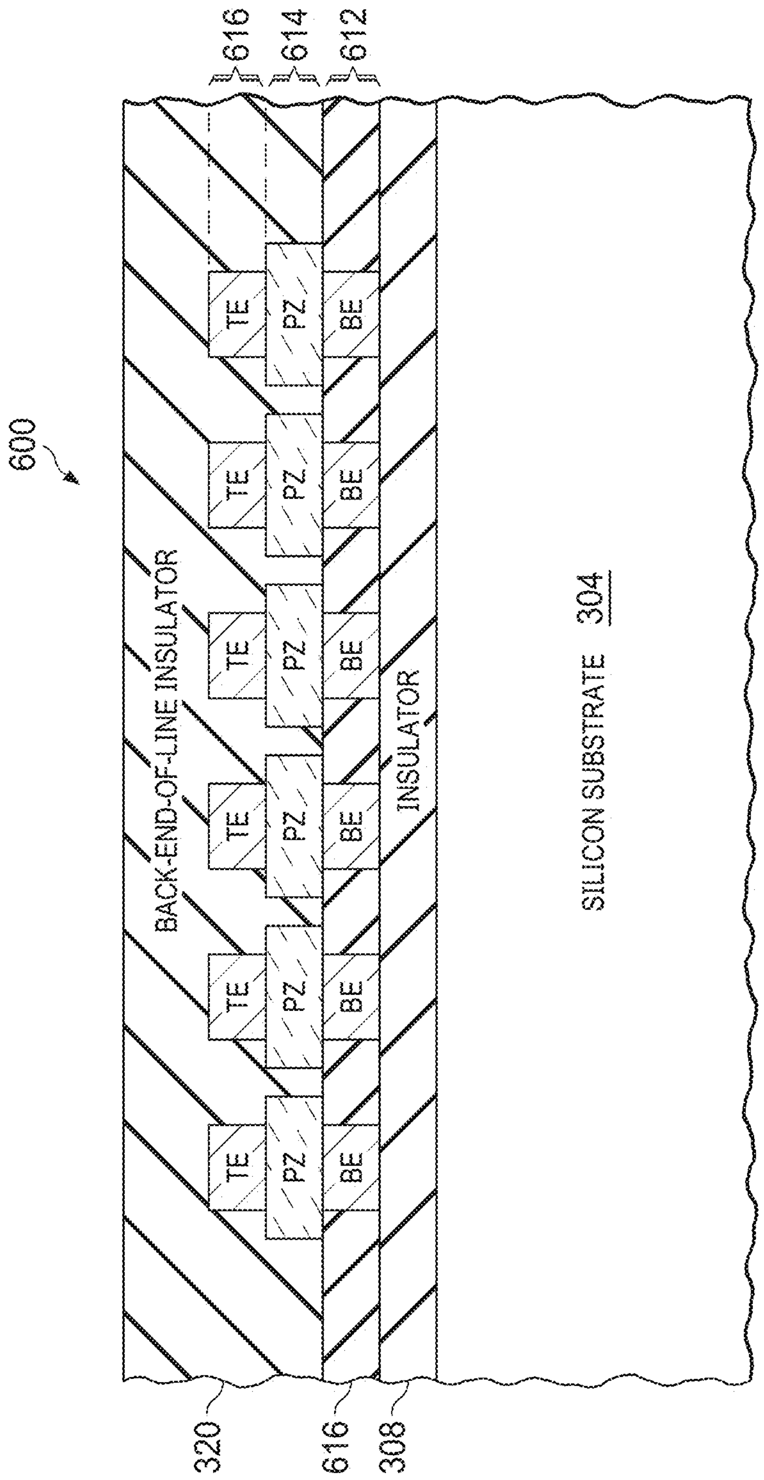

FIG. 6 illustrates a fourth example of acoustic signal generator 204. The acoustic signal generator 204 of FIG. 6 includes a piezoelectric transducer 600, which includes bottom electrodes (BE) 612 forming an inter-digitated structure (e.g., fingers) overlies the silicon substrate 304 and is embedded in insulator 308. An inter-digitated structure of piezoelectric material 614 of the piezoelectric transducer 600 overlies the bottom electrodes 612. An inter-digitated structure of conductive material forms top electrodes 616 of the piezoelectric transducer 600. In this manner, segments of the piezoelectric material 614 are sandwiched between a corresponding segment of the top electrodes 616 and a segment of the bottom electrodes 612. A back-end-of-line insulator 320 encapsulates the piezoelectric material 614 and the top electrodes 616.

Figure 7:
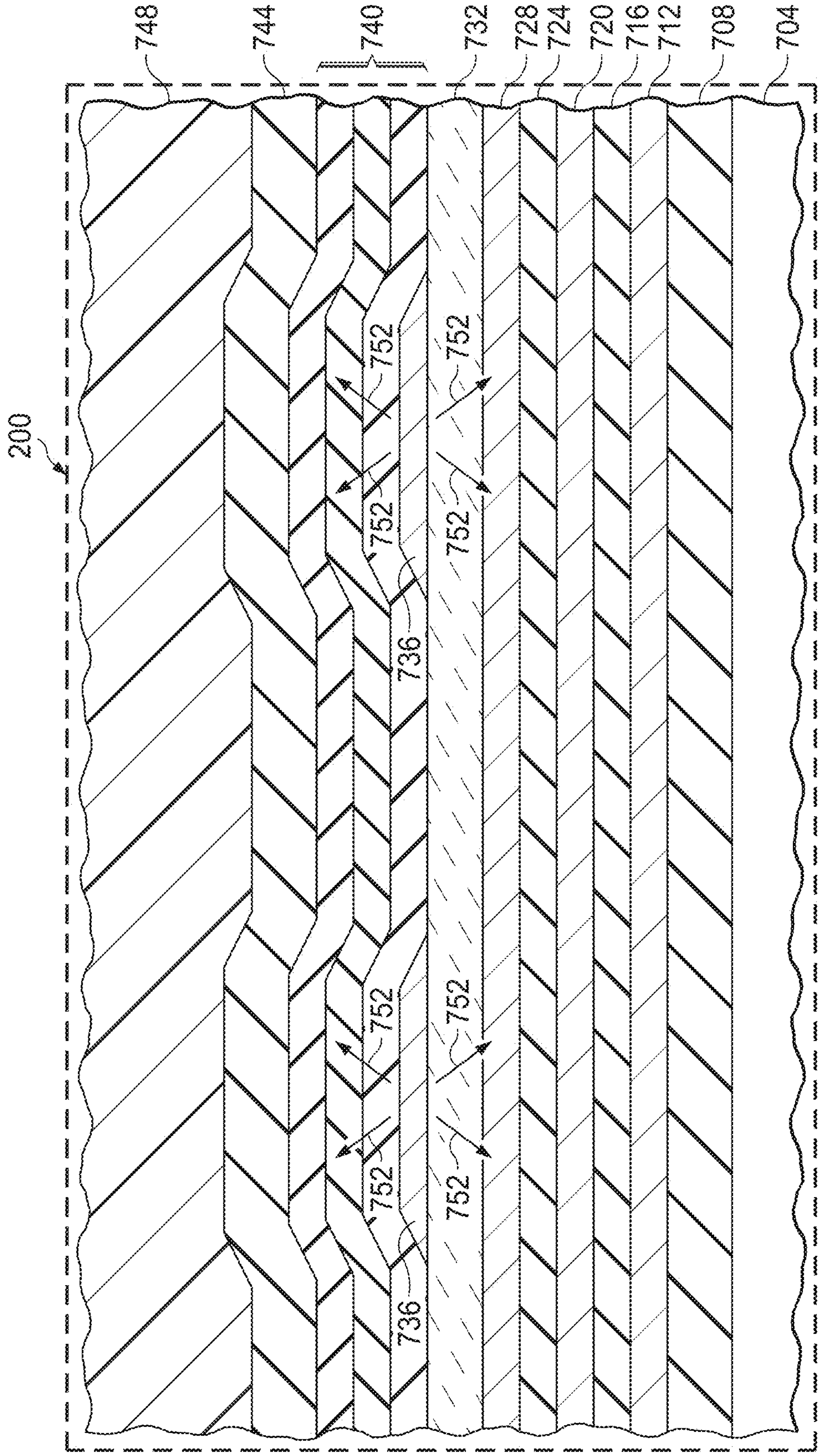

In the examples of FIG. 3-6, adjacent inter-digitated electrodes can be driven by driving signals having a phase difference (e.g., 180 degrees or other angles) to generate acoustic signals having such a phase difference between adjacent inter-digitated electrodes. As to be described below, such arrangements can generate angled acoustic radiation, where the acoustic signals can propagate not just along the vertical direction (e.g., along the y axis) but at other angles with respect to the silicon substrate 304 surface, or even laterally parallel to the silicon substrate 304 surface (e.g., along the x axis). This allows the acoustic signals to reach and become reflected at different surfaces, such as surfaces 130, 132, 134, 138, and interface 136. By propagating the acoustic signals at a wide range of angles to be reflected at multiple surfaces of the IC, it becomes more likely that the acoustic signals can be reflected at, for example, cracks or spots of delamination of the mold compound 112, cracks in the semiconductor die 104, unauthorized objects mounted on the mold compound surfaces 130/132/134, an unauthorized PCB mounted below the IC, etc., which can facilitate detection of integrity and/or security breaches. FIG. 7 illustrates a fifth example of an acoustic signal generator 204. The acoustic signal generator 204 can include a piezoelectric transducer and a Bragg mirror. The acoustic signal generator 204 includes an oxide layer 708 formed on the silicon substrate 704, which can represent the silicon substrate 304 of FIGS. 3-6 and can be part of the semiconductor die 104. A first metal layer 712 overlays the oxide layer 708, and a first dielectric layer 716 overlays the first metal layer 712. A second metal layer 720 overlays the first dielectric layer 716. A second dielectric layer 724 overlays the second metal layer 720. The first metal layer 712, the first dielectric layer 716, the second metal layer 720 and the second dielectric layer 724 are configured as a Bragg mirror to reflect acoustic waves and to trap the acoustic energy in acoustic signal generator 204.

A bottom electrode 728 of the piezoelectric transducer formed of a conductive material overlays the second dielectric layer 724. A layer of piezoelectric material 732 of the piezoelectric transducer overlays the bottom electrode 728. In some examples, the piezoelectric material 732 is formed of aluminum nitride. Top electrodes 736 of the piezoelectric transducer overlays the piezoelectric material 732. In the example illustrated, there are two (2) fingers formed of a conductive material forming the top electrode 736, but in other examples, there are more or less such fingers. Top electrodes 736 can represent inter-digitated top electrodes 324, 424, 516, and 616 of FIGS. 3-6. Dielectric layers 740 overlay the top electrodes 736. In the example illustrated, there are three (3) layers in the dielectric layers 740, but in other examples, there are more or less layers of dielectric. An insulating layer 744 overlays the dielectric layers 740. A mold compound 748 (e.g., the mold compound 112 of FIG. 1) overlays the insulating layer 744.

In operation, the bottom electrode 728 is coupled to an electrically neutral terminal (e.g., ground), and a drive signal (e.g., a current signal) is provided to the top electrode 736. Responsive to the drive signal, the piezoelectric material 732 vibrates and generates an acoustic signal, which propagates in the directions indicated by the arrows 752. The acoustic signals can reflect from, for example, the mold compound surfaces, the lead frame, and/or the PCB on which the IC is mounted, and the reflected acoustic signals and the transmitted acoustic signals can combine to form standing waves. The standing waves cause the IC that includes the acoustic signal generator 700 to vibrate. This vibration induces a stress on the components of the IC, including the silicon substrate 704 and the mold compound 748.

The amplitude of the standing wave depends on the phase difference between the reflected and transmitted acoustic signals, which depends on the wavelength (and frequency) of the acoustic signal. The amplitude of the standing wave also depends other factors, such as the structural property of the mold compound, whether an object is attached on the package surface, a property of the PCB on which the IC is mounted, etc. All these factors can impact the reflection of the acoustic signals and the amplitude and/or phase of the reflected acoustic signal, and the amplitude of the resulting standing wave. Accordingly, the amplitude of the resulting standing wave can provide indications of whether the integrity and/or security of the IC has been breached.

As illustrated in FIGS. 3-7, the acoustic signal generator 204 of FIG. 2 can include transducers of various architectures. In each such architecture, the acoustic signal generator has a first electrode (e.g., a top electrode) and a second electrode (e.g., a bottom electrode) with piezoelectric material between the first and second electrodes. As described with respect to FIGS. 1 and 2, in operation, the acoustic signal generators of FIGS. 3-7 provide an acoustic wave responsive to a drive signal with a frequency of about 8 megahertz (MHz) to about 1 gigahertz (GHz). Unless otherwise stated, in this description, 'about' preceding a value means +/−80 percent of the stated value. Moreover, the examples of architecture are not intended to be exhaustive.

Figure 8:
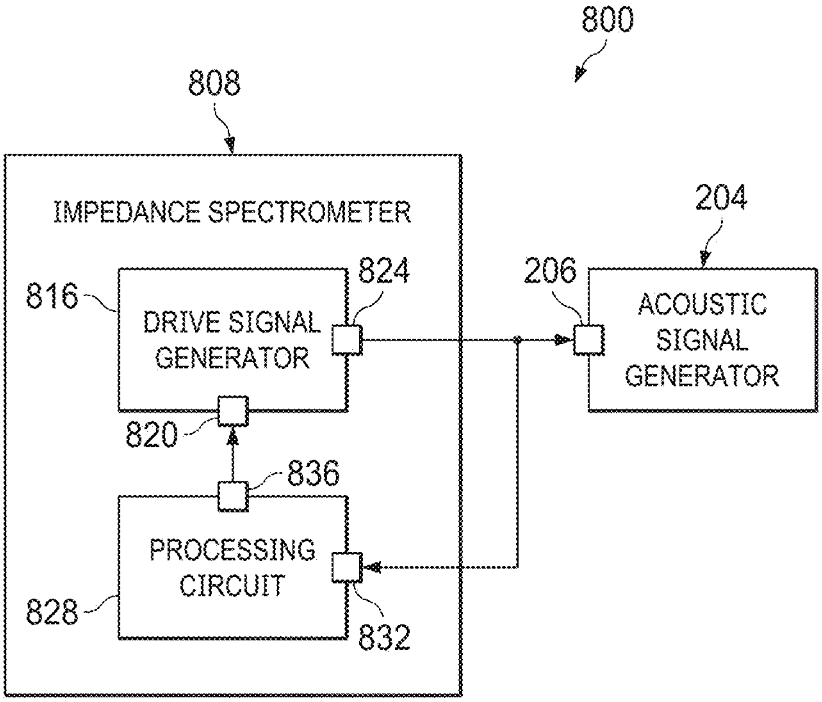
FIG. 8 is a schematic of an example impedance spectrometer circuit.

FIG. 8 illustrates an example circuit 800 to perform security/integrity breach detection using the acoustic signal generator 204. In some examples, circuit 800 can be on the semiconductor die 104 of FIGS. 1 and 2. In some examples, circuit 800 can be on a different semiconductor die 104 and can be internal or external to ICs 100 and 200 of FIGS. 1 and 2. The circuit 800 includes an impedance spectrometer circuit 808 that interfaces with the acoustic signal generator 204. The acoustic signal generator 204 includes an acoustic generator terminal 206. The acoustic signal generator 204 is configured to transmit acoustic signals responsive to a drive signal (e.g., a current signal) at the acoustic generator terminal 206.

The impedance spectrometer circuit 808 is configured to provide a current signal to electrodes of the acoustic signal generator 204, and measure a voltage across the electrodes when providing the current to determine an impedance. The impedance spectrometer circuit 808 can provide current signals having a pre-determined set of frequencies, and measure the voltages across the electrodes at each of the pre-determined set of frequencies, to generate an impedance spectrum.

Specifically, the impedance spectrometer circuit 808 includes a drive signal generator 816 having a control input 820 and a generator output 824. The generator output 824 is coupled to the acoustic generator terminal 206 of the acoustic signal generator 204. The impedance spectrometer circuit 808 also includes a processing circuit 828 having an acoustic signal input 832 and a control output 836. The acoustic signal input 832 is coupled to the acoustic generator terminal 206, and the control output 836 is coupled to the control input 820. The acoustic signal input 832 is coupled to the acoustic generator terminal 206 of the acoustic signal generator 204. The control output 836 is coupled to the control input 820 of the signal generator 816.

In operation, the control output 836 provides a control signal to the control input 820 of the drive signal generator 816. Responsive to the control signal, the drive signal generator 816 provides drive signals at the control input 820 having a predetermined set of frequencies. The set of frequencies of the drive signal is based on the control signal. In some examples, the set of frequencies of the drive signals is about 8 MHz to about 1 GHz. The drive signals may include current signals. Responsive to the drive signals, the acoustic signal generator 204 transmits acoustic signals.

As discussed above, the acoustic signal generator 204 may include inter-digitated electrodes, and drive signal generator 816 may provide drive signals having a phase difference (e.g., 180 degrees of other angles) between them for adjacent inter-digitated electrodes, so as to generate acoustic signals having that phase difference at adjacent electrodes. Such arrangements allow the acoustic signal generator 204 to generate angled acoustic radiation, so that the acoustic signals can propagate at a wide range of angles and become reflected at multiple surfaces of the IC, to facilitate detection of integrity and/or security breaches. In some examples, the acoustic signal generator 204 may transmit acoustic signals sequentially at each frequency in the set of frequencies at different intervals of time, with each interval at about 100 microseconds or more.

As described above, the acoustic signal input 832 of the processing circuit 828 is coupled to the acoustic generator terminal 206 of the acoustic signal generator 204. During an interval of time that the acoustic signal generator 204 transmits the acoustic signals having a particular frequency, the processing circuit 828 measures a voltage at the acoustic generator terminal 206 through the acoustic signal input 832. In some examples, the processing circuit 828 measures (e.g., samples) a voltage across at least two electrodes of the acoustic signal generator 204 as a function of time. Moreover, the processing circuit 828 stores data representing an amplitude of the current injected in the acoustic generator terminal 206 by the drive signal. Thus, the processing circuit 828 is able to determine the voltage across the acoustic signal generator 204 and the current injected into the acoustic signal generator 204 for each frequency of the set of frequencies. Accordingly, the processing circuit 828 can determine an impedance of the acoustic signal generator 204 for the set of frequencies based on the voltage across the acoustic signal generator 204 and the current injected in the acoustic signal generator 204. In this manner, the processing circuit generates a measurement spectrum (e.g., an impedance spectrum) based on the measured voltages at the set of frequencies. In some examples, the processing circuit may also determine a voltage spectrum without the current information.

As explained above, the voltage across the electrodes of the acoustic signal generator 204 can reflect an amplitude of the standing waves resulting from the propagation and reflection of the acoustic signals provided by the acoustic signal generator 204, and the impedance spectrum can provide indications of whether the integrity and/or security of the IC has been breached. The processing circuit 828 compares the measured impedance spectrum with a reference impedance spectrum stored at the processing circuit 828 to generate a difference. The difference can represent, for example, an impedance difference at a particular frequency, or an aggregate (e.g., average) impedance difference across the predetermined set of frequencies The processing circuit 828 can generate an alert signal responsive to the difference exceeding a threshold. More generally, the processing circuit 828 generates the alert signal responsive to the measurement spectrum. In some examples, the alert signal is provided to an external system. In other examples, the alert signal is stored in an internal memory of the processing circuit 828. In some examples, the processing circuit 828 may perform other functions, such as disabling some or all circuits on the IC to prevent malicious access to various functions of the circuits and/or the data stored in the IC.

Figure 9:
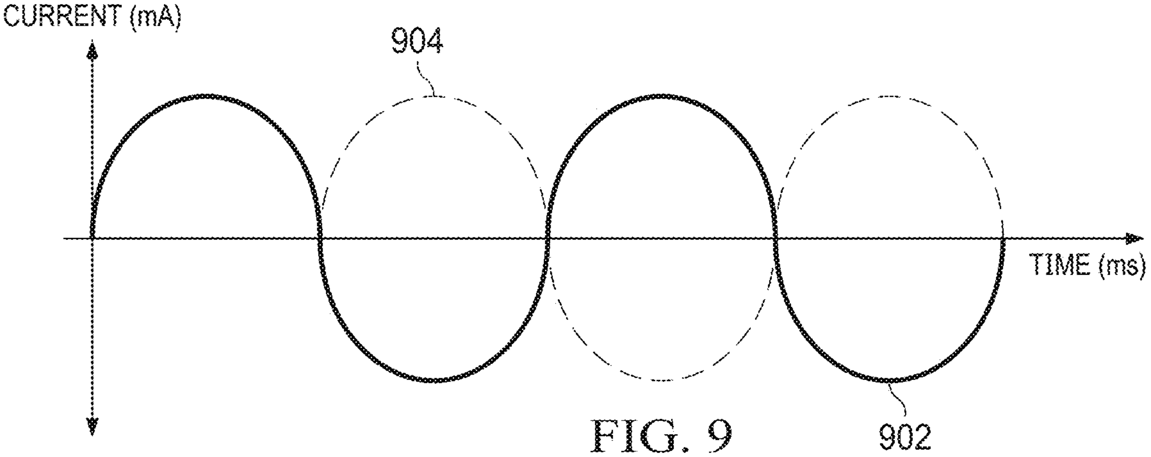
FIG. 9 includes graphs of example drive signals provided to an acoustic signal generator.

FIG. 9 includes graphs 900 and 902 of example drive signals provided by drive signal generator 816 to of the acoustic signal generator 204, such as to adjacent top electrodes 324 of FIG. 3, adjacent top electrodes 424 of FIG. 4, adjacent top electrodes 516 of FIG. 5, adjacent top electrodes 616 of FIG. 6 and/or adjacent top electrodes 736 of FIG. 7. In the example of FIG. 9, the drive signals are illustrated in graphs 902 and 904 as continuous sinusoidal waves that have a phase difference of 180 degrees. However, in other examples, the drive signals can have a phase difference other than 180 degrees. Also, the drive signals can have other forms, such as square waves.

Figure 10A:
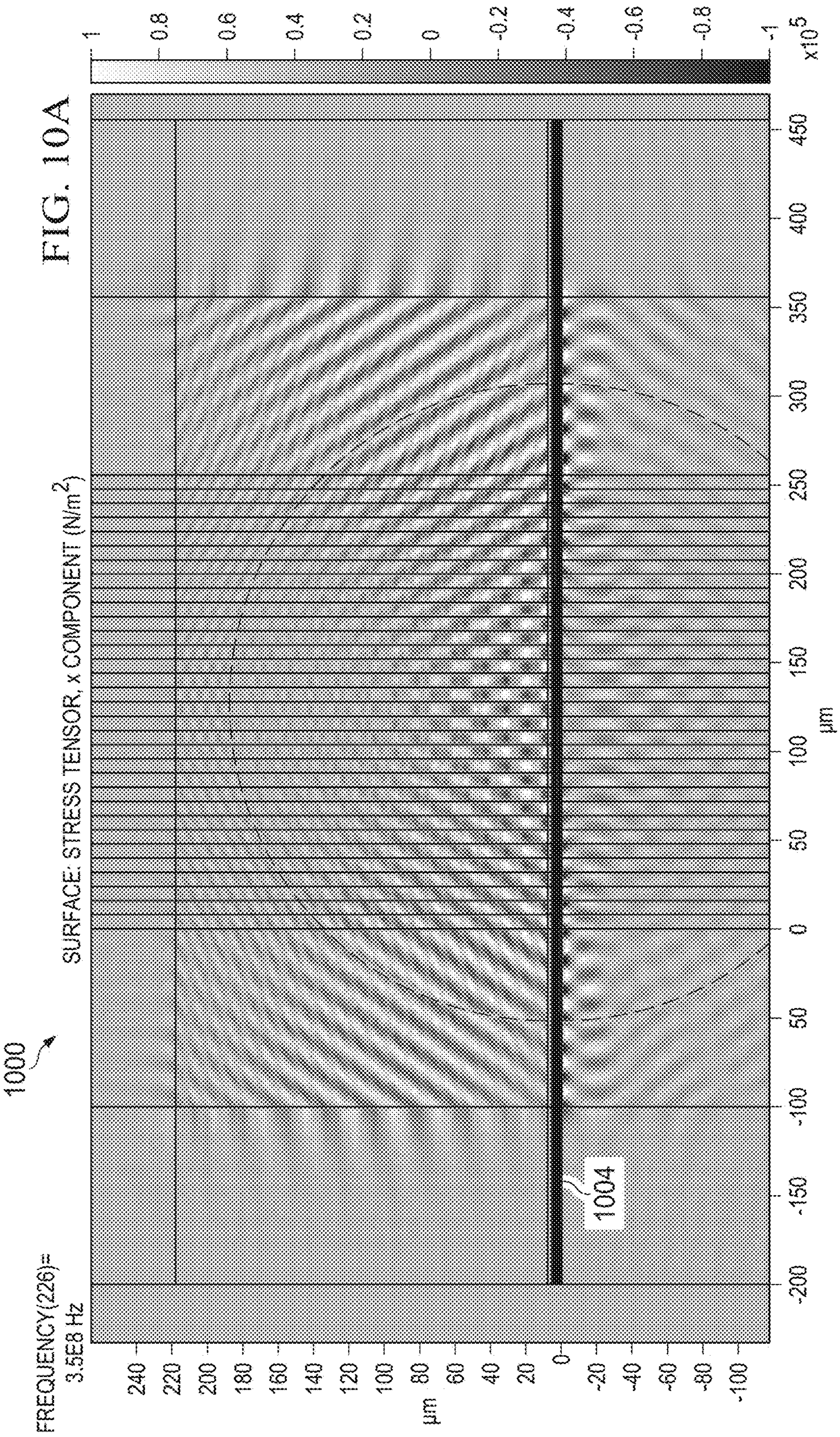
FIGS. 10A-10C are graphs that illustrate example distributions of stress caused by acoustic signals in an IC.
Figure 10B:
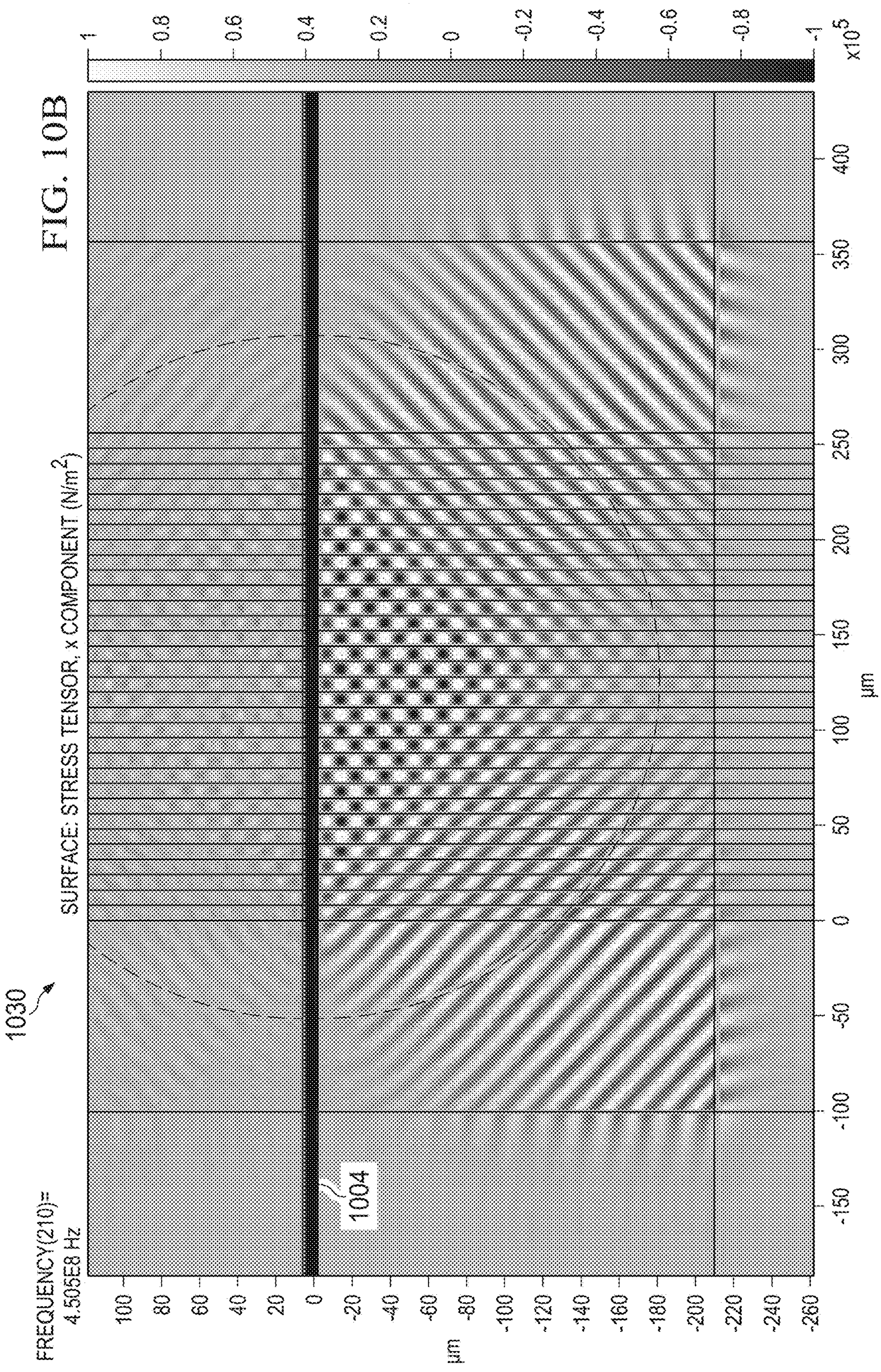
Figure 10C:
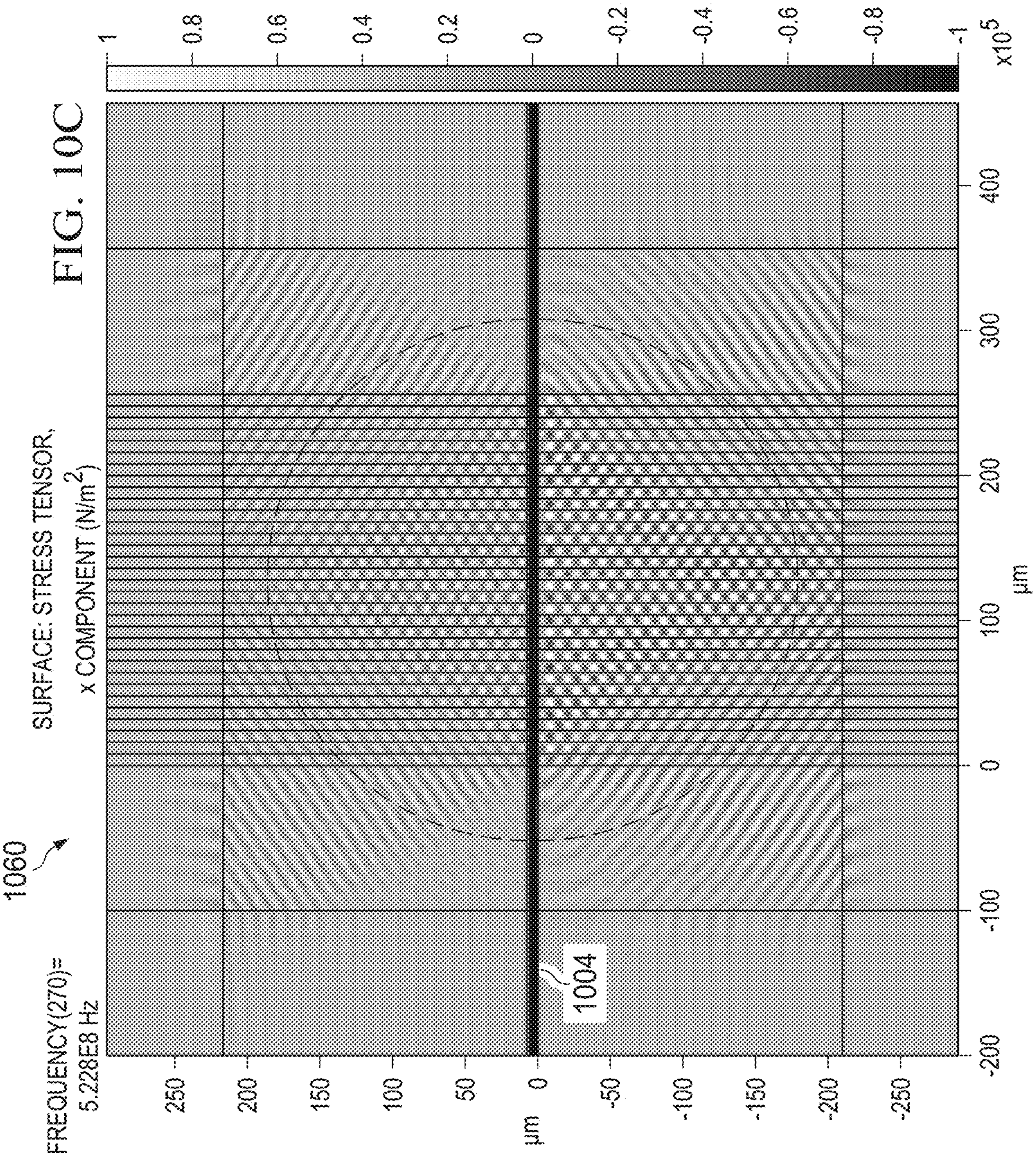

FIGS. 10A, 10B and 10C are graphs that illustrate example distributions of stress caused by acoustic signals in an IC. Each of FIGS. 10A, 10B, and 10C plots the distribution of stress caused by acoustic waves as a function of two-dimensional position, in micrometers (μm) and in an IC, such as the IC 100 of FIG. 1 and/or the IC 200 of FIG. 2. Although the diagrams illustrated in FIGS. 10A, 10B and 10C plot stress, in other examples, the plotted feature could represent other quantities, such as vibration. In some examples, the stress is responsive to a drive signal, such as the drive signals represented by graphs 902 and 904 of FIG. 9.

More particularly, FIG. 10A illustrates a graph 1000 that plots an example distribution of stress caused by acoustic waves at a frequency of 350 megahertz (MHz). In the graph 1000, line 1004 represents a boundary between the mold compound 112 and the semiconductor die 104 in the IC. Accordingly, in the graph 1000, a vertical position between −110 μm and 0 μm represents the semiconductor die 104, and a vertical position between 0 μm and 260 μm represents the mold compound 112.

As illustrated by the graph 1000, in situations where an acoustic signal generator (e.g., the acoustic signal generator 204 of FIG. 2) generates the acoustic signals/waves at the frequency of 350 MHz, most of the acoustic signals propagate away from the line 1004 (the boundary) into the mold compound. More generally, in the graph 1000, the acoustic signal generator transmits the acoustic signals in a direction perpendicular to line 1004. But the acoustic signals generated by adjacent electrodes have a phase difference, the wave fronts of the acoustic signals become angled from line 1004. Those acoustic signals can reflect at different surfaces of the IC and form standing waves, and the wave fronts of the standing waves (represented by lines of maximum or minimum stress) also become angled from line 1004.

FIG. 10B illustrates a graph 1030 that plots an example distribution of stress caused by acoustic waves at a frequency of 450 MHz. As illustrated by the graph 1030, in situations where an acoustic signal generator (e.g., the acoustic signal generator 204 of FIG. 1) generates the acoustic signals at a frequency of 450 MHz, and most of the acoustic signals can propagate away from the line 1004 (the boundary) into the semiconductor die, namely the portion of the IC below the line 1004. Similar to shown in FIG. 10A, the wave fronts of the standing waves (represented by lines of maximum or minimum stress) are angled from line 1004 due to adjacent electrodes being driven by drive signals having a phase difference between them.

FIG. 10C illustrates a graph 1060 that plots an example distribution of stress caused by acoustic waves at a frequency of 522.8 MHz. As illustrated by the graph 1060, in situations where an acoustic signal generator (e.g., the acoustic signal generator 204 of FIG. 2) generates the acoustic signals at a frequency of 522.8 MHz, the acoustic signals propagate away from the line 1004 into both the semiconductor die and into the mold compound more evenly compared to FIGS. 10A and 10B. Similar to shown in FIGS. 10A and 10B, the wave fronts of the standing waves (represented by lines of maximum or minimum stress) are angled from line 1004 due to adjacent electrodes being driven by drive signals having a phase difference between them.

Accordingly, as illustrated through the graph 1000 of FIG. 10A, the graph 1030 of FIG. 10B and the graph 1060 of FIG. 10C, changing the frequency of the drive signals can alter the relative amplitudes/powers of acoustic signals propagating in the semiconductor die and in the mold compound. Accordingly, impedance spectrometer circuit 808 can select a frequency of the drive signal based on whether to direct the acoustic signals into the semiconductor die (e.g., to detect cracks in the semiconductor die, mounting of the IC on an unauthorized PCB, etc.), or to direct to the acoustic signals into the molding compound (e.g., to detect cracks/delamination of the mold compound, mounting of unauthorized objects on the mold compound external surface, etc.), or both.

Figure 11:
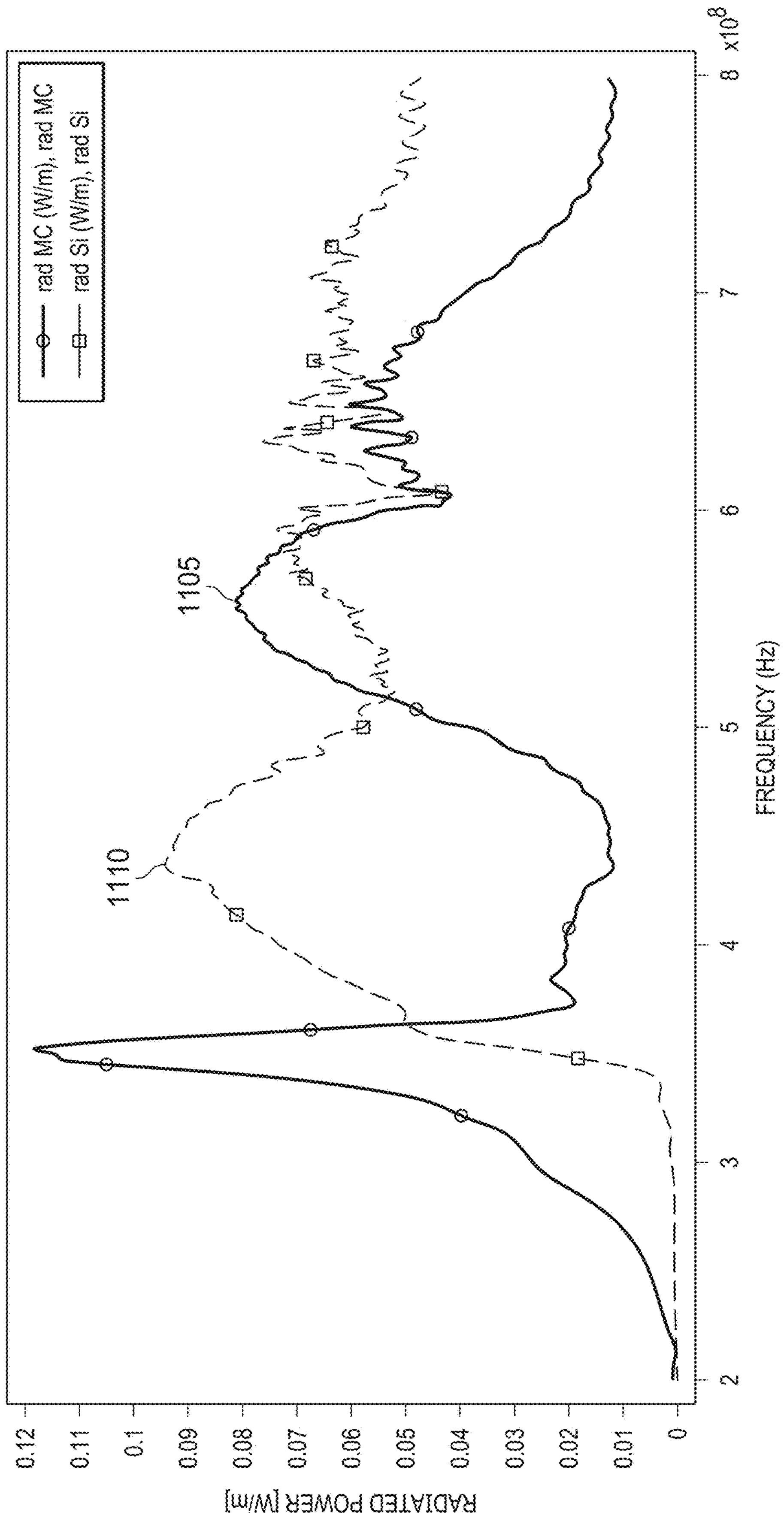
FIG. 11 includes graphs illustrating example relationships between radiated acoustic signal power in an IC and the acoustic signal frequency.

FIG. 11 includes graphs 1105 and 1110 that illustrate examples of radiated acoustic signal power (e.g., the ICs 100 and 200 of FIGS. 1 and 2), in watts per meter (W/m) as a function of acoustic signal frequency, in hertz (Hz). The radiated acoustic signal power can represent the standing waves in the IC due to propagation and reflection of acoustic signals provided by the acoustic signal generator 204. Graph 1105 plots the radiated acoustic power of a mold compound (e.g., mold compound 112). The graph 1110 plots the radiated acoustic signal power of a semiconductor die (e.g., semiconductor die 104). As illustrated by the graph 1105, the radiated acoustic signal power in the mold compound reaches a peak at a frequency of about 350 MHz. Also, as illustrated by the graph 1110, the radiated acoustic signal power reaches a peak at a frequency of about 450 MHz. Also, the mold compound and the semiconductor die can have similar radiated acoustic power at a frequency of about 522.8 MHz.

Figure 12:
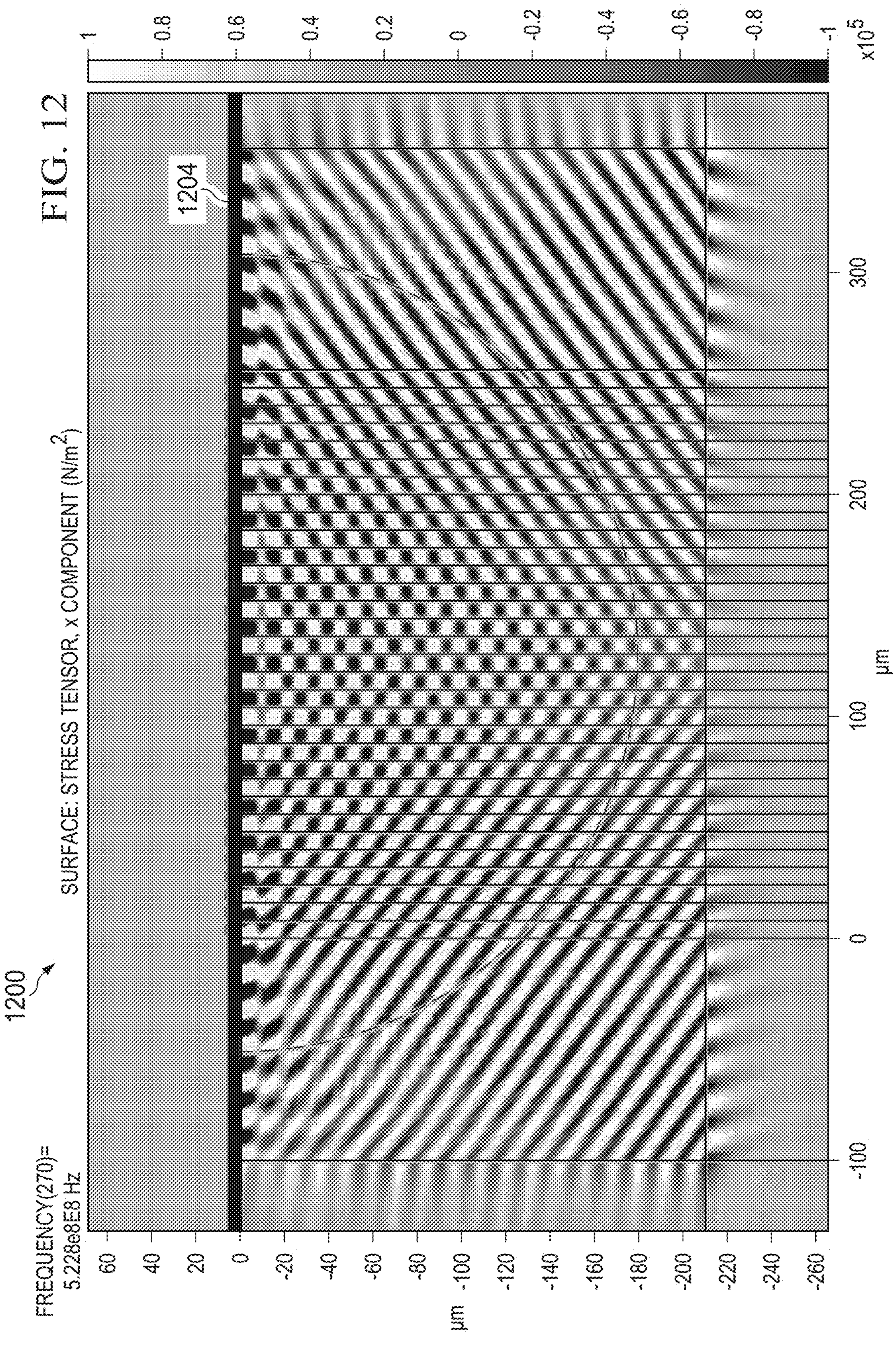
FIG. 12 is a graph that illustrates an example distribution of stress caused by propagation of acoustic signals an IC having a mold compound removed.
Figure 13:
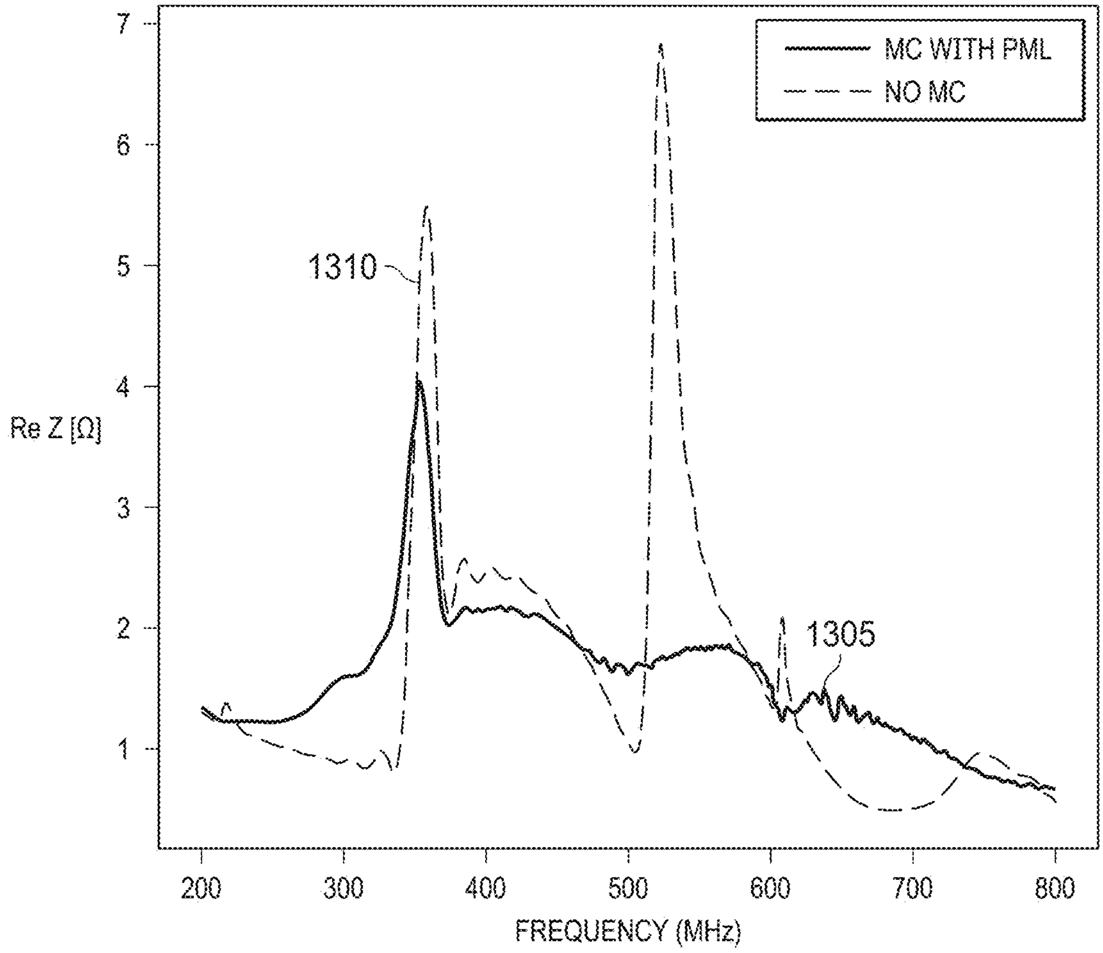
FIG. 13 includes graphs illustrating example impedance spectrums of an acoustic signal generator in an IC and an acoustic signal frequency.

The stress distribution examples illustrated in FIGS. 10A, 10B, 10C, and the radiated signal power example illustrated in FIG. 11 can represent a normal state of the IC where the security and the mechanical (e.g., structural) integrity of the IC are not compromised. In situations where a mechanical integrity of a mold compound (e.g., the mold compound 112) is compromised (e.g., cracked), the propagation and reflection of the acoustic signals will change, which leads to changes in the amplitudes of the standing waves, the radiated acoustic signal power, and the measured impedances at different frequencies. Also, in situations where an unknown device, such as an unauthorized monitoring device (e.g., an antenna) is affixed to the mold compound, the IC being mounted on an unauthorized PCB, etc., the amplitudes of the standing waves, the radiated acoustic signal power, and the measured impedances at different frequencies may also change. In either situation, the processing circuit 828 of the circuit 800 can detects a change in the impedance of the acoustic signal generator 204 at a particular frequency, or across a set of frequencies, and asserts an alert signal (and/or performs other actions) in response. More generally, the acoustic signal generator 204 generates the alert signal (and/or performs other actions) responsive to a mechanical integrity of the IC being compromised, or a security of the IC being compromised. FIGS. 12 and 13 illustrate this concept.

FIG. 12 includes a graph 1200 that plots an example distribution of stress caused by acoustic waves at a frequency of 522.8 MHz in an IC where the mold compound has been removed. In graph 1200, line 1204 represents a boundary between the mold compound 112 and the semiconductor die 104 in the IC. Accordingly, in the graph 1200, a vertical position between −110 μm and 0 μm represents the semiconductor die 104, and a vertical position between 0 μm and 260 μm represents the mold compound 112. Comparing with graph 1060 of FIG. 10C, the darker shades in graph 1200 indicate that the semiconductor die 104 is under more stress. This can be because the acoustic signals generated by the acoustic signal generator 204 do not propagate through the remaining mold compound and lose less energy as radiated power. Those high energy acoustic signals can be reflected (e.g., at the boundary of BEOL insulator 328) and enter the semiconductor die, thereby increasing the stress observed in the die.

FIG. 13 includes graphs of example impedance spectrums of an acoustic signal generator (e.g., the acoustic signal generator 204 of FIG. 1) in an IC (e.g., the IC 200 of FIG. 2), in ohms (Ω) as a function of frequency, in MHz. Graph 1305 represents a real portion of the impedance spectrum of the acoustic signal generator 204 in an IC having a normal state (e.g., having the entirety of the mold compound 112), and can be based on data represented in graph 1000 of FIG. 10A, the graph 1030 of FIG. 10B and the graph 1060 of FIG. 10C. Graph 1310 represents a real portion of the impedance spectrum of the acoustic signal generator 204 in an IC with the mold compound removed, and be based on data represented in graph 1200 of FIG. 12. Graphs 1310 and 1315 illustrate significant differences in the impedance spectrums between a case where the mold compound 112 is present and a case where the mold compound 112 is removed. For example, graph 1315 shows that with the mold compound removed, the impedance spectrum has peaks at 400 MHz and 550 MHz. In contrast, graph 1310 shows that with the mold compound present, the impedance spectrum has a lower peak (compared with graph 1315) at 400 MHz and no peak at 550 MHz.

Using the operations described with respect to FIG. 8, the circuit 800 is included to detect a breach in the integrity and/or security of the IC. Specifically, processing circuit 828 can store a reference impedance spectrum representing the IC in the normal state, such as the impedance spectrum represented by graph 1305 of FIG. 13. The processing circuit 828 can determine the impedance of the acoustic signal generator 204 at each of the pre-determined set of frequencies to generate a measured impedance spectrum, and determine a difference between the stored input impedance and the measured input impedance. The difference can represent, for example, an impedance difference at a particular frequency, or an aggregate (e.g., average) impedance difference across the predetermined set of frequencies. For example, at a frequency of 550 MHz, the difference between the stored input impedance (about 1.8Ω) and the measured input impedance (about 6.75Ω) is about 4.95Ω. The processing circuit 828 can assert an alarm signal (or take other actions) if the difference exceeds a threshold of, for example, 1.0Ω. Thus, in this example, the processing circuit 828 asserts the alarm signal, indicating that a breach of the IC may have occurred.

Figure 14:
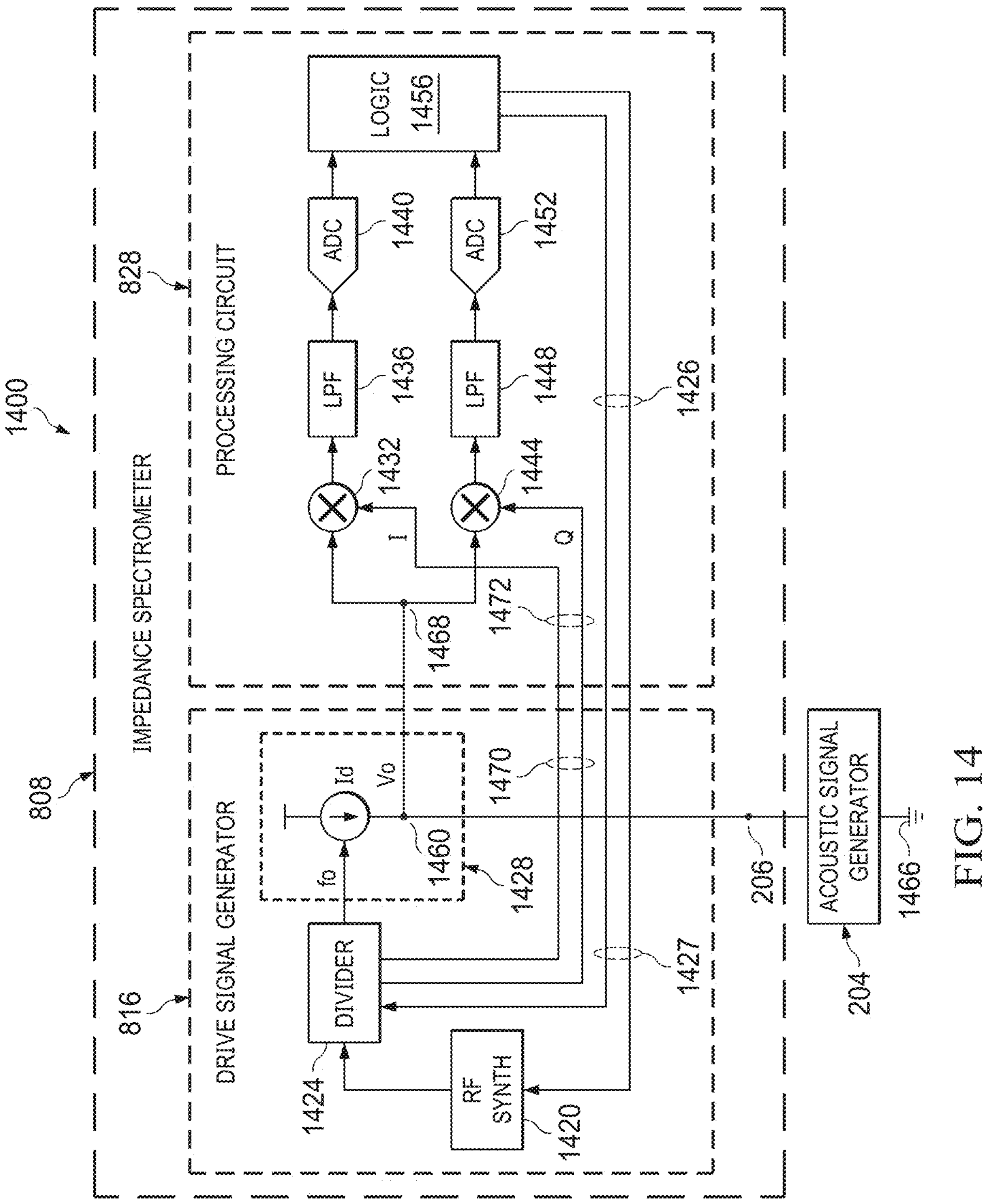
FIG. 14 is a schematic that illustrate example internal components of an impedance spectrometer circuit.

FIG. 14 is a schematic illustrating example internal components of the circuit 800. The drive signal generator 816 includes a radio frequency (RF) synthesizer 1420, a divider 1424 and a current source 1428. The processing circuit 800 includes a first mixer 1432, a first low pass filter 1436 and a first analog-to-digital converter (ADC) 1440. The processing circuit 828 also includes a second mixer 1444, a second low pass filter 1448 and a second ADC 1452. The processing circuit 1416 further includes logic 1456.

In operation, periodically and/or asynchronously, the logic 1456 provides a first control signal to the RF synthesizer 1420 and a second control signal on a control output 1426 to the divider 1424 at a control input 1427. Responsive to the first control signal, the RF synthesizer 1420 provides an RF signal on a synthesizer output to a synthesizer input of the divider 1424 of the signal generator 816. The frequency of the RF signal is dictated by the first control signal. Responsive to the second control signal, the divider 1424 divides the RF signal and outputs a fundamental frequency control (having a frequency $f_0$) on a first divider output. The fundamental frequency control, has a frequency $f_0$ that is a quotient of the frequency of the RF signal.

The fundamental frequency signal is provided to a frequency control input of current source 1428. Responsive to the fundamental frequency signal, the current source 1428 provides a drive signal on a current output of the current source 1428 that is coupled to a generator output 1460 of the signal generator 816. The drive signal has a frequency about equal to the frequency of the fundamental frequency signal ($f_0$) and has a predetermined amplitude (labelled Id in FIG. 14).

The generator output 1460 is coupled to the acoustic generator terminal 206 of the acoustic signal generator 204. The acoustic signal generator 204 is also coupled to an electrically neutral terminal 1466 (e.g., ground). Responsive to the drive signal, the acoustic signal generator 204 provides an acoustic signal that propagates in the IC. The first mixer 1432 has a first mixer input and a second mixer input. The first mixer input is coupled to the acoustic generator terminal 206. The second mixer 1444 has a third mixer input and a fourth mixer input. The third mixer input is coupled to the acoustic generator terminal 206.

The processing circuit 828 includes a processing input 1468 coupled to the acoustic generator terminal 206. The processing input 1468 is coupled to the first mixer 1432 and to the second mixer 1444 of the processing circuit 1416. The processing input 1468 has a voltage, $V_0$, that is equal to the voltage across the acoustic signal generator 204, which can represent the voltage between two electrodes of the acoustic signal generator 204

The divider 1424 provides a quadrature pair of signals on a quadrature output 1470 of the drive signal generator 816 to a quadrature input 1472 of the processing circuit 828. More particularly, the divider 1424 provides an in-phase signal, I on a second divider output to the second mixer input of the first mixer 1432 and a quadrature signal, Q to the second mixer 1444 on a third divider output to the fourth mixer input of the second mixer 1444. Accordingly, the first mixer 1432 mixes the voltage signal $V_0$, with the in-phase signal I, and provides a first mixed signal on a first mixer output to a first filter input of the first low pass filter 1436. The first low pass filter 1436 filters a high frequency portion of the first mixed signal, and outputs a first filtered mixed signal on a first filter output. Similarly, the second mixer 1444 mixes the voltage signal $V_0$, with the quadrature signal Q and provides a second mixed signal on a second mixer output to a second filter input of the second low pass filter 1448. The second low pass filter 1448 filters a high frequency portion of the first mixed signal, and outputs a second filtered mixed signal on a second filter output. The I/Q mixing and low pass filtering operations can separate out the real and imaginary components of the voltage signal $V_0$.

The first ADC 1440 has a first ADC input coupled to the first filter output. The first ADC 1440 is configured to convert the first filtered mixed signal into a first digital signal that is provided to a first logic input of the logic 1456. The second ADC 1452 has a second ADC input coupled to the second filter output. The second ADC 1452 is configured to convert the second filtered mixed signal into a second digital signal that is provided to a second logic input of the logic 1456. The logic 1456 can set the frequency of the fundamental frequency signal ($f_0$) according to a set of predetermined frequencies. At each frequency, the logic 1456 can obtain digital samples of $V_0$ from ADCs 1440 and 1452 and compute an impedance of the acoustic signal generator 204 based on the current output at the generator output 1460 and the digital samples of $V_0$ for that frequency. For example, based on the output by the first ADC 1440, the logic 1456 can determine a real part of the impedance. Also, based on the output of the second ADC 1452, the logic 1456 can determine an imaginary part of the impedance of the acoustic signal generator 204.

The logic 1456 can also determine a difference between the measured impedance (e.g., an impedance spectrum) for the frequencies of the set of frequencies, and a stored reference impedance (e.g., a reference impedance spectrum) for the set of frequencies. If the difference exceeds a threshold, the logic 1456 asserts an alarm signal. The threshold is selected based on an environment of application. For instance, in examples where the IC 100/200 is employed in a vehicle that incurs external vibrations, the threshold is selected to be a relatively large impedance, such as about 4.0Ω or more. In examples where the IC 100/200 is employed in a security sensitive environment, the threshold is selected to be a relatively low impedance, such as about 1.0Ω or less. In some examples, this alarm signal is provided to an external source. In other examples, this alarm signal is stored in an internal register of the logic 1456 that is retrieved at a later time.

Figure 15:
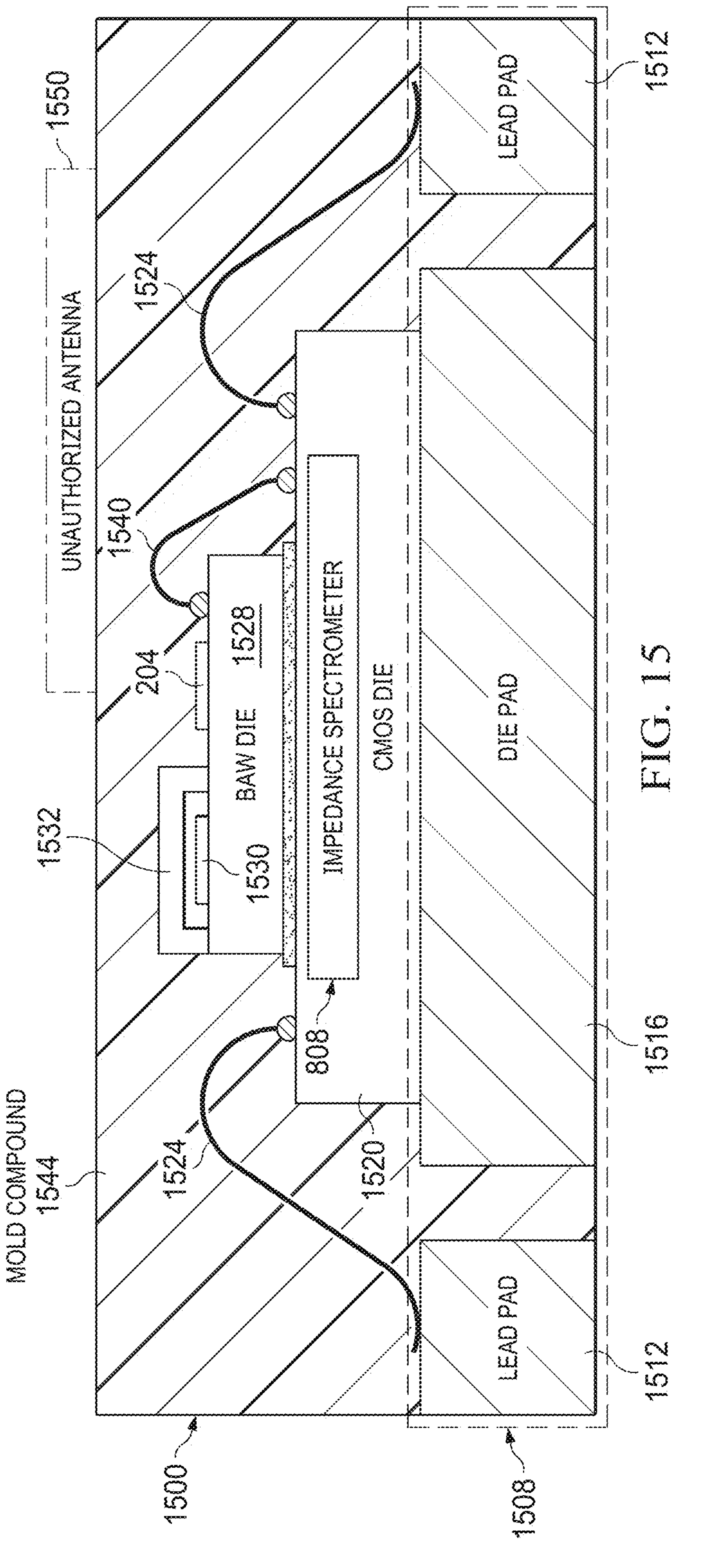
FIG. 15 is a schematic of an IC including an acoustic signal generator and an impedance spectrometer circuit.

FIG. 15 is a schematic of an example IC 1500, which can be part of or includes ICs 100 and 200. The IC 1500 includes circuitry to measure an input impedance of the acoustic signal generator 204 to determine if the mechanical integrity or security of the IC 1500 has been breached. The IC 1500 includes a lead frame 1508, which includes lead pads 1512 and a die pad (or a die attach pad) 1516.

The IC 1500 also includes a complementary metal oxide semiconductor (CMOS) die 1520 mounted on the die pad 1516. The IC 1500 also includes wire bonds 1524 coupled between the CMOS die 1520 and the lead pads 1512. In the example illustrated, the CMOS die 1520 includes the impedance spectrometer circuit 808. In other examples, other types of circuits are included in the CMOS die 1520. The IC 1500 also includes a BAW die 1528. In the example shown in FIG. 15, the BAW die 1528 is on the CMOS die 1520. In some examples, the BAW die 1528 can be adjacent to the CMOS die 1520 along a lateral direction. The BAW die 1528 includes the acoustic signal generator 204 and an oscillator 1530. Accordingly, in the example illustrated, the acoustic signal generator 204 can include a BAW resonator with a set of electrodes, similar to the ones shown in FIGS. 3-7. Some of the electrodes form oscillator 1530 to provide clocking, and a silicon cap 1532 covers the oscillator 1530 to provide stress protection. Other electrodes of the BAW resonators are not covered by silicon cap 1532 and can form acoustic signal generator 204 to transmit acoustic signals for IC integrity/security breach detection. Interconnects (e.g., bond wires) 1540 couples the BAW die 1528 to the CMOS die 1520. The CMOS die 1520 includes circuitry for controlling the operation of the acoustic signal generator 204. A mold compound 1544 encapsulates the CMOS die 1520 and the BAW die 1528. The oscillator 1530 can be fabricated in the same process as that of the acoustic signal generator 204. Thus, dies, such as the BAW die 1528 that include a BAW resonator (e.g., the resonator 1408) employed for timing or radio frequency (RF) filtering purposes can seamlessly incorporate the acoustic signal generator 204 with the oscillator 1530 with a small overhead and cost adder.

In the example illustrated, an unauthorized antenna 1550 (e.g., an intruder antenna) is affixed to a surface of the mold compound 1544. It is presumed that the unauthorized antenna 1550 is attempting to make unauthorized observations (e.g., spying) on the operation of the IC 1500. For purposes of this example, it is presumed that the unauthorized antenna 1550 was affixed on the IC 1500 after the IC 1500 had been installed in an environment of application (e.g., mounted on a circuit board).

The CMOS die 1520 includes the impedance spectrometer circuit 808. As described with respect to FIG. 14, the impedance spectrometer circuit 808 is configured to measure an impedance of the acoustic signal generator 204 for a set of frequencies. Also, the impedance spectrometer is configured to determine a difference between the measured impedance spectrum for the set of frequencies and a reference impedance spectrum (representing a normal state of IC 1500) for the set of frequencies. If the difference exceeds a threshold, the impedance spectrometer 808 asserts an alarm signal indicating that the mechanical integrity or the security of the IC 1500 may be compromised.

As described above, in the example illustrated, the unauthorized antenna 1550 has been affixed to the mold compound 1544, which can change the reflection of acoustic waves, similar to the manner shown in the graph 1200 of FIG. 12, and the resulting standing waves, which also causes the measured impedance spectrum to deviate from the reference impedance spectrum. The impedance spectrometer circuit 808 detects this change in the impedance spectrum of the acoustic signal generator 204, and asserts the alarm signal.

Figure 16:
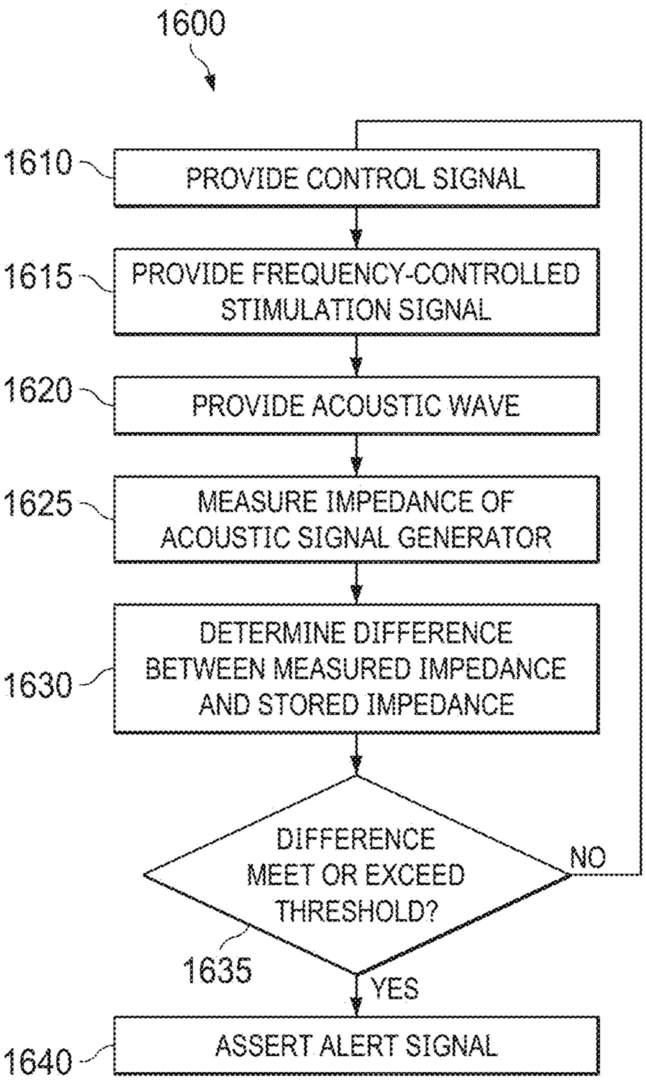
FIGS. 16 and 17 are flowcharts of example methods for detecting a mechanical integrity breach and/or a security breach of an IC.

FIG. 16 is a flowchart of an example method 1600 for detecting whether a mechanical integrity or a security of an IC (e.g., IC 100 of FIG. 1, the IC 200 of FIG. 2 or the IC 1500 of FIG. 15) has been breached. The method 1600 is executable by a circuit, such as the circuit 800 of FIGS. 8 and 14. The circuit includes an impedance spectrometer (e.g., the impedance spectrometer circuit 808 of FIG. 8) and an acoustic signal generator (e.g., the acoustic signal generator 204 of FIG. 2). The acoustic signal generator includes a transducer having at least two electrodes.

At 1610, a processing circuit (e.g., the processing circuit 828 of FIG. 8) of the impedance spectrometer provides a control signal to a drive signal generator (e.g., the drive signal generator 816 of FIG. 8) of the impedance spectrometer.

At 1615, responsive to the control signal, the frequency generator provides a drive signal at a set of frequencies. The set of frequencies is dictated by the control signal.

At 1620, responsive to the drive signal, the acoustic signal generator provides acoustic signals that propagates throughout the IC.

At 1625, during the providing of the acoustic signals, the processing circuit measures an impedance of the acoustic signal generator. More specifically, the processing circuit measures an impedance between two electrodes of the transducers of the acoustic signal generator.

At 1630, the processing circuit determines a difference between the measured input impedance for the set of frequencies and a stored input impedance for the set of frequencies.

At 1635, the processing circuit makes a determination as to whether the difference between the measured input impedance for the set of frequencies and a stored input impedance for the set of frequencies meets or exceeds a threshold. If the determination at 1635 is negative (e.g., NO), the method 1600 returns to 1610. If the determination at 1635 is positive (e.g., YES), the method 1600 proceeds to 1640. At 1640, the processing circuit asserts an alarm signal. The alarm signal indicates that the mechanical integrity or the security of the IC has been breached. In some examples, the alert signal is provided to an external source. In other examples, the alert signal is stored in an internal register or other memory structure of the IC. In some examples, the processing circuit performs other actions, such as disabling other circuits on the IC, to prevent malicious access.

Figure 17:
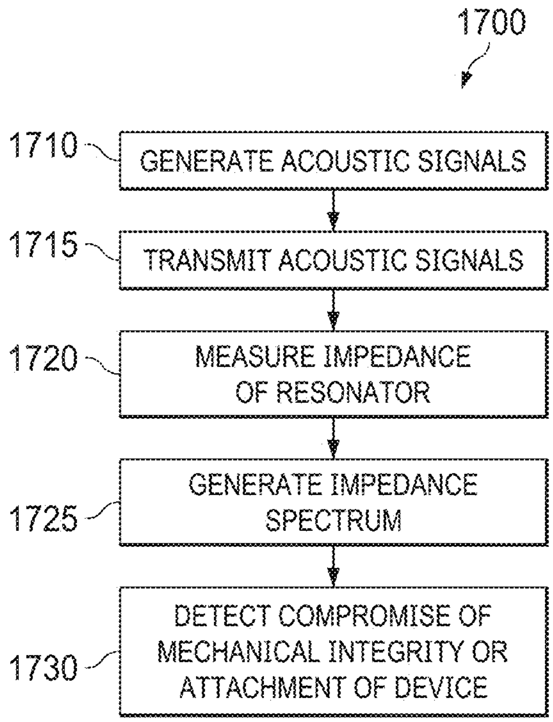

FIG. 17 is a flowchart that illustrates an example method 1700 for detecting whether a mechanical integrity or a security of an IC (e.g., IC 100 of FIG. 1, the IC 200 of FIG. 2 or the IC 1500 of FIG. 15) has been breached. The method 1700 is executable by an IC, such as the IC 100 of FIG. 1, the IC 200 of FIG. 2 and/or the IC 1500 of FIG. 15.

At 1710, an acoustic signal generator (e.g., the acoustic signal generator 204) generates acoustic signals having a predetermined set of frequencies. The acoustic signal generator includes a transducer. In some examples, the acoustic signals are generated by the transducer responsive to a drive signal provided from a drive signal generator (e.g., the signal generator 816 of FIG. 8).

At 1715, the acoustic signals are transmitted via a mold compound (e.g. the mold compound 112 of FIG. 1) and/or a semiconductor substrate (e.g., the semiconductor substrate of FIG. 1) of the IC.

At 1720, a processing circuit (e.g., the processing circuit 828 of FIG. 8) measures an impedance between two electrodes of the acoustic signal generator at each frequency of the set of frequencies during the transmitting.

At 1725, the processing circuit generates an impedance spectrum based on the measured impedances.

At 1730, the processing circuit detects a mechanical integrity compromise of the IC or attachment of an unknown component on the IC based on the impedance spectrum. More specifically, the processing circuit compares the impedance spectrum to a reference spectrum to detect the mechanical integrity comprise of the IC or the attachment of the unknown component (e.g., an unauthorized antenna) to the IC.

Figure 18:
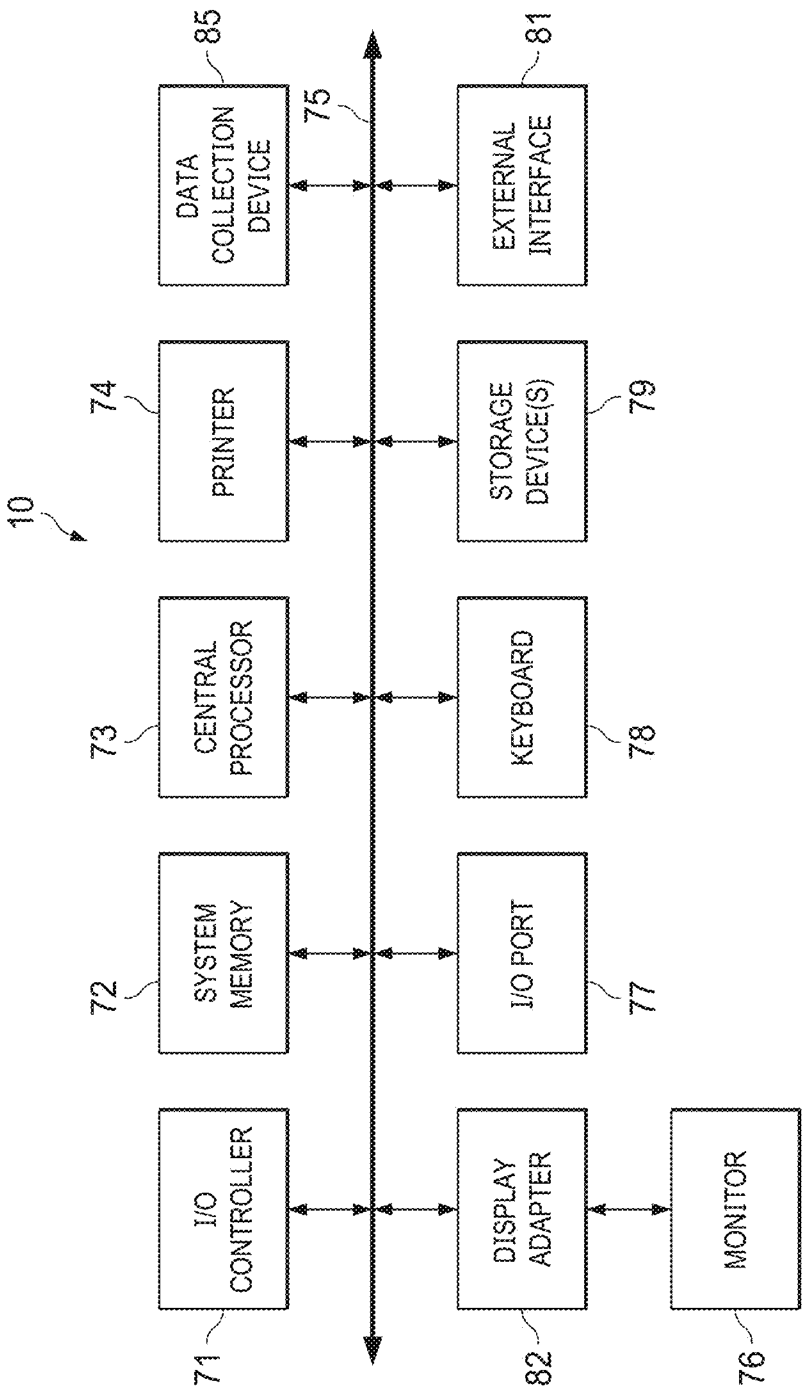
FIG. 18 illustrates an example hardware computing system that can implement example methods for detecting a mechanical integrity breach and/or a security breach of an IC.

Any of the computing systems mentioned herein may utilize any suitable number of subsystems. Examples of such subsystems are shown in FIG. 18 in a hardware computing system 10, which can be part of or include processing circuit 828.

The subsystems shown in FIG. 16 are interconnected via a system bus 75. Additional subsystems such as a printer 74, keyboard 78, storage device(s) 79, monitor 76 (which is coupled to display adapter 82) and others are shown. Peripherals and input/output (I/O) devices, which couple to I/O controller 71, can be connected to the hardware computing system by any number of means such as input/output (I/O) port 77 (e.g., USB, FireWire®). For example, I/O port 77 or external interface 81 (e.g. Ethernet, Wi-Fi, etc.) can be used to connect hardware computing system 10 to a wide area network such as the Internet, a mouse input device, or a scanner. The interconnection via system bus 75 allows the central processor 73 to communicate with each subsystem and to control the execution of a plurality of instructions from system memory 72 or the storage device(s) 79 (e.g., a fixed disk, such as a hard drive, or optical disk), and the exchange of information between subsystems. The system memory 72 and/or the storage device(s) 79 may embody a computer readable medium. In some examples, central processor 73 can be part of the processing circuit 828, logic 1458, etc., which can execute instructions stored in system memory 72 and/or storage device(s) 79 to perform the example methods described above in FIG. 16 and FIG. 17, and use system memory 72 to store the input data, output data, as well as intermediary data generated from the performance of the methods. For example, system memory 72 can store the reference impedance spectrum, the input impedance spectrum, and the data representing current Id.

Another subsystem is a data collection device 85, such as ADCs 1440 and 1452. Data collection device 85 can store the data (e.g., samples of voltage signals) at system memory 72. Any of the data described herein can be output from one component to another component and can be provided to the user.

A hardware computing system can include the same components or subsystems, e.g., connected together by external interface 81 or by an internal interface. In some embodiments, hardware computing systems, subsystem, or apparatus can communicate over a network. In such instances, one computer can be a client and another computer a server, where each can be part of a same computer system. A client and a server can each include multiple systems, subsystems, or components.

Aspects of embodiments herein can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computing system), and may be present on or within different computer products within a system or network. A computing system may include a monitor, printer, or other suitable display for providing any of the results mentioned herein to a user.

Any of the methods described herein may be totally or partially performed with a computing system including one or more processors, which can be configured to perform the steps. Thus, embodiments can be directed to computing systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, units, circuits, or other means for performing these steps.

In this description, the term "couple" may cover connections, communications or signal paths that enable a functional relationship consistent with this description. Accordingly, if device A generates a signal to control device B to perform an action, then: (a) in a first example, device A is coupled directly to device B; or (b) in a second example, device A is coupled to device B through intervening component C if intervening component C does not substantially alter the functional relationship between device A and device B, so device B is controlled by device A via the control signal generated by device A.

A device "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

As used herein, the terms "terminal", "node", "interconnection", "pin" and "lead" are used interchangeably. Unless specifically stated to the contrary, these terms are generally used to mean an interconnection between or a terminus of a device element, a circuit element, an integrated circuit, a device or other electronics or semiconductor component.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

While the use of particular transistors are described herein, other transistors (or equivalent devices) may be used instead with little or no change to the remaining circuitry. For example, a metal-oxide-silicon FET ("MOSFET") (such as an n-channel MOSFET, nMOSFET, or a p-channel MOSFET, pMOSFET), a bipolar junction transistor (BJT—e.g. NPN or PNP), insulated gate bipolar transistors (IGBTs), and/or junction field effect transistor (JFET) may be used in place of or in conjunction with the devices described herein. The transistors may be depletion mode devices, drain-extended devices, enhancement mode devices, natural transistors or other type of device structure transistors. Furthermore, the devices may be implemented in/over a silicon substrate (Si), a silicon carbide substrate (SiC), a gallium nitride substrate (GaN) or a gallium arsenide substrate (GaAs).

While certain elements of the described examples are included in an integrated circuit and other elements are external to the integrated circuit, in other examples, additional or fewer features may be incorporated into the integrated circuit. In addition, some or all of the features illustrated as being external to the integrated circuit may be included in the integrated circuit and/or some features illustrated as being internal to the integrated circuit may be incorporated outside of the integrated. As used herein, the term "integrated circuit" means one or more circuits that are: (i) incorporated in/over a semiconductor substrate; (ii) incorporated in a single semiconductor package; (iii) incorporated into the same module; and/or (iv) incorporated in/on the same printed circuit board.

Uses of the phrase "ground" in the foregoing description include a chassis ground, an Earth ground, a floating ground, a virtual ground, a digital ground, a common ground, and/or any other form of ground connection applicable to, or suitable for, the teachings of this description. Unless otherwise stated, "about," "approximately," or "substantially" preceding a value means within +/−10 percent of the stated value, or, if the value is zero, a reasonable range of values around zero. Modifications are possible in the described examples, and other implementations are possible, within the scope of the claims.

What is claimed is:

1. An integrated circuit (IC) comprising:

a substrate;

an acoustic signal generator over the substrate and including at least two electrodes configured to receive two respective signals that have a phase difference between the two respective signals; and an encapsulation material covering the acoustic signal generator and the substrate.

2. The IC of claim 1, wherein the acoustic signal generator includes a transducer having the at least two electrodes.

3. The IC of claim 2, wherein the acoustic signal generator is configurable to transmit acoustic signals along a direction perpendicular to a surface of the substrate.

4. The IC of claim 3, wherein the acoustic signal generator is configurable to transmit the acoustic signals along multiple directions each having a different angle with respect to the surface.

5. The IC of claim 2, wherein the at least two electrodes include a first electrode and a second electrode, the acoustic signal generator further includes a piezoelectric material coupled to the first and second electrodes.

6. The IC of claim 5, wherein the piezoelectric material is between the first and second electrodes.

7. The IC of claim 5, wherein the first and second electrodes are on a same side of the piezoelectric material; and wherein the transducer is configurable to generate acoustic signals responsive to receiving a first signal at the first electrode and a second signal at the second electrode, the first signal having a particular phase difference from the second signal.

8. The IC of claim 7, wherein the particular phase difference equals 180 degrees.

9. The IC of claim 2, further comprising a processing circuit having processing inputs coupled to the at least two electrodes, and the processing circuit configurable to:

at each frequency of a predetermined set of frequencies, measure a first signal across the at least two electrodes;

generate a measurement spectrum based on the measured first signal and the predetermined set of frequencies; and generate a second signal responsive to the measurement spectrum.

10. The IC of claim 9, wherein the second signal indicates at least one of: a mechanical integrity of the IC being compromised, an unknown or unauthorized object being attached on the encapsulation material, or the IC being mounted on an unknown or unauthorized object.

11. The IC of claim 9, wherein the processing circuit is configurable to compare the measurement spectrum with a reference spectrum, and generate the second signal responsive to the comparison.

12. The IC of claim 9, wherein the first signal includes a voltage signal.

13. The IC of claim 9, wherein the measurement spectrum includes an impedance spectrum.

14. The IC of claim 13, wherein the impedance spectrum includes an imaginary part and a real part.

15. The IC of claim 1, wherein the acoustic signal is transmitted at each of a predetermined set of frequencies for a predetermined interval of time.

16. The IC of claim 1, further comprising a drive signal generator configurable to provide a drive signal to the acoustic signal generator, and the acoustic signal generator transmits acoustic signals responsive to the drive signal.

17. The IC of claim 16, wherein the drive signal includes a current signal.

18. The IC of claim 16, further comprising:

a first die having the acoustic signal generator; and a second die having the drive signal generator.

19. The IC of claim 1, wherein the acoustic signal generator is configurable to transmit acoustic signals through at least one of the substrate or the encapsulation material.

20. The IC of claim 1, wherein the substrate is a semiconductor substrate.

21. The IC of claim 1, wherein the encapsulation material includes a mold compound.

22. A method for transmitting acoustic signals, the method comprising:

generating acoustic signals having a predetermined set of frequencies with a transducer;

transmitting the acoustic signals via at least one of an encapsulation material or a substrate of an integrated circuit (IC); and responsive to transmitting the acoustic signal, detecting at least one of: whether a mechanical integrity compromise of the IC occurs, or an unknown or unauthorized object is coupled to the IC.

23. The method of claim 22, further comprising:

determining an impedance between two electrodes of the transducer at each frequency of the predetermined set of frequencies during the transmitting; and generating an impedance spectrum responsive to determining the impedance, wherein the detecting comprises comparing the impedance spectrum to a reference spectrum.

24. A non-transitory computer readable medium storing instructions that, when executed by a controller of an IC, causes the controller to:

generate acoustic signals having a predetermined set of frequencies via a transducer of the IC;

transmit the acoustic signals via at least one of an encapsulation material or a substrate of the IC; and responsive to transmitting the acoustic signal, detecting at least one of: whether a mechanical integrity compromise of the IC occurs, or an unknown or unauthorized object is coupled to the IC.

* * * * *